United States Patent [19]
Castelli et al.

[11] Patent Number: 6,134,541
[45] Date of Patent: *Oct. 17, 2000

[54] SEARCHING MULTIDIMENSIONAL INDEXES USING ASSOCIATED CLUSTERING AND DIMENSION REDUCTION INFORMATION

[75] Inventors: Vittorio Castelli, White Plains; Chung-Sheng Li, Ossining; Alexander Thomasian, Pleasantville, all of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/961,729

[22] Filed: Oct. 31, 1997

[51] Int. Cl.$^7$ .................................................. G06F 17/30
[52] U.S. Cl. ........................................ 707/2; 707/1; 707/3
[58] Field of Search ....................... 707/2, 3, 1; 395/601, 395/600

[56] References Cited

U.S. PATENT DOCUMENTS

| | | | |
|---|---|---|---|
| 4,839,853 | 6/1989 | Deerwester et al. | 364/900 |
| 5,179,643 | 1/1993 | Homma et al. | 395/140 |
| 5,359,724 | 10/1994 | Earle | 395/425 |
| 5,647,058 | 7/1997 | Agrawal et al. | 395/601 |
| 5,675,819 | 10/1997 | Schuetze | 395/760 |
| 5,787,422 | 7/1998 | Tukey et al. | 707/5 |
| 5,819,258 | 10/1998 | Vaithyanathan | 707/2 |
| 5,857,179 | 1/1999 | Vaithyanathan et al. | 707/2 |

OTHER PUBLICATIONS

Gersho, "Optimal Nonlinear Interpolative Vector Quantization", IEEE Transactions on Communications, vol. 38, No. 9, Sep. 1990, pp. 1285–1287.

Milanese et al, "Correspondance Analysis and Hierarchical Indexing for Content–Based Image Retrieval", IEEE 1996. pp. 859–862.

Joseph Linde, et al., "An Algorithm for Vector Quantizer Design", IEEE Transactions on Communications, vol. COM–28, No. 1, Jan. 1980, pp. 84–95.

Jerome H. Friedman, et al., "An Algorithm for Finding Nearest Neighbors", IEEE Transactions on Computers, Oct. 1975, 7 pages.

IBM Search Software, "IBM MediaMiner", http://www-.software.com/data/mediaminer/immn0b21.html, Oct. 10, 1997, 7 pages.

IBM Search Software, MediaMiner: IBM Query by Image Content, "IBM Query by Image Content", http://www.software.ibm.com/data/mediaminer/immn0b14.html, Oct. 10, 1997, 2 pages.

QBIC Home Page, The QBIC Project, "QBIC™—IBM's Query By Image Content", http://wwwqbic.almaden.ibm-.com/, Oct. 19, 1997, 2 pages.

(List continued on next page.)

*Primary Examiner*—Thomas G. Black
*Assistant Examiner*—Uyen Le
*Attorney, Agent, or Firm*—Kevin M. Jordan; Wayne L. Ellenbogen

[57] ABSTRACT

An improved multidimensional data indexing technique that generates compact indexes such that most or all of the index can reside in main memory at any time. During the clustering and dimensionality reduction, clustering information and dimensionality reduction information are generated for use in a subsequent search phase. The indexing technique can be effective even in the presence of variables which are not highly correlated. Other features provide for efficiently performing exact and nearest neighbor searches using the clustering information and dimensionality reduction information. One example of the dimensionality reduction uses a singular value decomposition technique. The method can also be recursively applied to each of the reduced-dimensionality clusters. The dimensionality reduction also can be applied to the entire database as a first step of the index generation.

51 Claims, 15 Drawing Sheets

OTHER PUBLICATIONS

Trademark Demo Introduction Page, Trademark Server, http://wwwqbic.almaden.ibm.com/tmdemo/, Oct. 10, 1997, 3 pages.

IBM Search Software, DB2 Image Extender, DB2 Extenders, Universal Database, Image, http://www.software.ibm.com/data/db2/extenders image.htm, Oct. 10, 1997, 4 pages.

Hanan Samet, Region Representation: Quadtrees from Boundary Codes, Graphics and Image Processing, J.D. Foley, Editor, Communications of the ACM Mar. 1980, vol. 23, No. 3, pp. 163–170.

Chi–Tsong Chen, Linear System Theory and Design, Department of Electrical Engineering State University of NY at Stony Brook, pp. 565–571, no date.

Jim Gray, et al., "Data Cube: A Relational Aggregation Operator Generalizing Group–By, Cross–Tab, and Sub–Totals," 1996 IEEE, pp. 152–159.

Antonin Guttman, "R–Trees: A Dynamic Index Structure for Spatial Searching," Proceedings of Annual Meeting, SIGMOD '84 SIGMOD Record vol. 14, No. 2, Boston, MA, Jun. 18–21, 1984, pp. 47–57.

Belur V. Dasarathy, "Nearest Neighbor(NN) Norms: NN Patern Classification Techniques", IEEE Computer Society Press, The Institute of Electronics Engineers, Inc., Table of Contents, no date.

Roger A. Horn, et al., "Matrix Analysis," Cambridge University Press, pp. 205, 411, 414–423, no date.

Brian Everitt, "Cluster Analysis," Second Edition, Social Science Research Council, Heinemann Educational Books, London, Halsted Press, Division of John Wiley & Sons, NY, pp. 64–67, no date.

Leonard Kaufman, et al., "Finding Groups in Data, An Introduction to Cluster Analysis," A Wiley Interscience Publication, John Wiley & Sons, Inc., pp. vi–xiv, no date.

Ritei Shibata, "An optimal selection of regression variables," Biometrika (1981), 68, 1, pp. 45–54.

Raymond Ng, et al., "Evaluating Multi–Dimensional Indexing Structures for Images Transformed by Principal Component Analysis," Dept. of Computer Science, Univ. of British Columbia, 1996, SPIE, vol. 2670, pp. 50–61.

IBM Technical Disclosure Bulletin, "Multidimensional Index Structure with Multi–Level Entry and Skip–Level Search for Partially–Specified Queries," vol. 39, No. 11, Nov. 1996, pp. 37–39.

T. Y. Young and P. S. Liu, "Overhead Storage Considerations and a Multilinear Method for Data File Compression," IEEE Transactions on Software Engineering, vol. SE–6, No. 4, Jul. 1980, pp. 340–347.

SEARCHING MULTIDIMENSIONAL INDEXES USING ASSOCIATED CLUSTERING AND DIMENSION REDUCTION INFORMATION

CROSS-REFERENCE TO RELATED APPLICATIONS

The present invention is related to co-pending patent application Ser. No. 08/960,540, entitled "Multidimensional Data Clustering and Dimension Reduction for Indexing and Searching," by Castelli et al., ed of even date herewith, IBM Docket No. YO997170. This co-pending application and the present invention are commonly assigned to the International Business Machines Corporation, Armonk, N.Y. This co-pending application is hereby incorporated by reference in its entirety into the present application

FIELD OF THE INVENTION

The present invention is related to improved information retrieval systems. A particular aspect of the present invention is related to searching compact index representations of multidimensional data. A more particular aspect of the present invention is related to searching compact index representations of multidimensional data in database systems using associated clustering and dimension reduction information.

BACKGROUND

Multidimensional indexing is fundamental to spatial databases, which are widely applicable to Geographic Information Systems (GIS), Online Analytical Processing (OLAP) for decision support using a large data warehouse, and multimedia databases where high-dimensional feature vectors are extracted from image and video data.

Decision support is rapidly becoming a key technology for business success. Decision support allows a business to deduce useful information, usually referred to as a data warehouse, from an operational database. While the operational database maintains state information, the data warehouse typically maintains historical information. Users of data warehouses are generally more interested in identifying trends rather than looking at individual records in isolation. Decision support queries are thus more computationally intensive and make heavy use of aggregation. This can result in long completion delays and unacceptable productivity constraints.

Some known techniques used to reduce delays are to pre-compute frequently asked queries, or to use sampling techniques, or both. In particular, applying online analytical processing (OLAP) techniques such as data cubes on very large relational databases or data warehouses for decision support has received increasing attention recently (see e.g., Jim Gray, Adam Bosworth, Andrew Layman, and Hamid Pirahesh, "Data Cube: A Relational Aggregation Operator Generalizing Group-By, Cross-Tab, and Sub-Totals", International Conference on Data Engineering, 1996, New Orleans, pp. 152–160) ("Gray"). Here, users typically view the historical data from data warehouses as multidimensional data cul)es. Each cell (or lattice point) in the cube is a view consisting of an aggregation of interests, such as total sales.

Multidimensional indexes can be used to answer different types of queries, including:
find record(s) with specified values of the indexed columns (exact search);
find record(s) that are within [a1 ... a2], [b1 ... b2], [z1 ... z2] where a, b and z represent different dimensions (range search); and
find the k most similar records to a user-specified template or example (k-nearest neighbor search).

Multidimensional indexing is also applicable to image mining. An example of an image mining product is that trademarked by IBM under the name MEDIAMINER, which offers two tools: Query by Image Content (QBIC); and IMAGEMIXER, for retrieving images by analyzing their content rather than by searching in a manually created list of associated keywords.

QBIC suits applications where keywords cannot provide an adequate result such as in libraries for museums and art galleries; or in online stock photos for Electronic Commerce where visual catalogs let you search on topics, such as wallpapers and fashion, using colors and texture.

Image mining applications such as IMAGEMINER let you query a database of images using conceptual queries like "forest scene", "ice", or "cylinder". Image content such as color, texture, and contour are combined as simple objects that are automatically recognized by the system.

These simple objects are represented in a knowledge base. This analysis results in a textual description that is then indexed for later retrieval.

During the execution of a database query, the database search program accesses part of the stored data and part of the indexing structure; the amount of data accessed depends on the type of query and on the data provided by the user, as well as on the efficiency of the indexing algorithm. Large databases are such that the data and at least part of the indexing on the larger, slower and cheaper part of the memory hierarchy of the computer system, usually consisting of one or more hard disks. During the search process, part of the data and of the indexing structure are loaded in the faster parts of the memory hierarchy, such as the main memory and the one or more levels of cache memory. The faster parts of the memory hierarchy are generally more expensive and thus comprise a smaller percentage of the storage capacity of the memory hierarchy. A program that uses instructions and data that can be completely loaded into the one or more levels of cache memory is faster and more efficient than a process that in addition uses instructions and data that reside in the main memory which in turn is faster than a program that also uses instruction and data that reside on the hard disks. Technological limitations are such that the cost of cache and main memory makes it too expensive to build computer systems with enough main memory or cache to completely contain large databases.

Thus, there is a need for an improved indexing technique that generates indexes of such size that most or all of the index can reside in main memory at any time; and that limits the amount of data to be transferred from the disk to the main memory during the search process. The present invention addresses such a need.

Several well known spatial indexing techniques, such as R-trees can be used for range and nearest neighbor queries. Descriptions of R-trees can be found, for example, in "R-trees: A Dynamic index structure for spatial searching," by A. Guttman, ACM SIGMOD Conf. on Management of Data, Boston, Mass., June, 1994. The efficiency of these techniques, however, deteriorates rapidly as the number of dimensions of the feature space grows, since the search space becomes increasingly sparse. For instance, it is known that methods such as R-Trees are not useful when the number of dimensions is larger than 8, where the usefulness criterion is the time to complete a request compared to the time required by a brute force strategy the request by sequentially scanning every record in the database. The inefficiency of conventional indexing techniques in high dimensional spaces is a consequence of a well-known phenomenon called the "curse of dimensionality," which is described, for instance, in "From Statistics to Neural Networks," NATO ASI Series, vol. 136, Springer-Verlag, 1994, by V. Cherkassky, J. H. Friedman, and H. Wechsles. The relevant consequence of the curse of dimensionality is that clustering the index space into hypercubes is an inefficient method for feature spaces with a higher number of dimensions.

Because of the inefficiency associated with using existing spatial indexing techniques for indexing a high-dimensional feature space, techniques well known in the art exist to reduce the number of dimensions of a feature space. For example, the dimensionality can be reduced either by variable subset selection (also called feature selection) or by singular value decomposition followed by variable subset selection, as taught, for instance by C T. Chen, "Linear System Theory and Design", Holt, Rinehart and Winston, Appendix E, 1984. Variable subset selection is a well known and active field of study in statistics, and numerous methodologies have been proposed (see e.g., Shibata et al. "An Optimal Selection of Regression Variables," Biometrika vol. 68, No. 1, 1981, pp. 45–54. These methods are effective in an index generation system only if many of the variables (columns in the database) are highly correlated. This assumption is in general incorrect in real world databases.

Thus, there is also a need for an improved indexing technique for high-dimensionality data, even in the presence of variables which are not highly correlated. The technique should generate efficient indexes from the viewpoints of memory utilization and search speed. The present invention addresses these needs.

SUMMARY

In accordance with the aforementioned needs, the present invention is directed to an improved apparatus and method for efficiently performing exact and similarity searches on multidimensional data. One example of an application of the present invention is to multidimensional indexing. Multidimensional indexing is fundamental to spatial databases, which are widely applicable to: Geographic Information Systems (GIS); Online Analytical Processing (OLAP) for decision support using a large data warehouse; and products such as IBM's QBIC and IMAGEMINER for image mining of multimedia databases where high-dimensional feature vectors are extracted from image and video data.

The present invention has features for performing exact searches using one or more reduced dimensionality indexes to multidimensional data includes the steps of: associating specified data (such as a user-provided example or a template record) to a cluster, based on clustering information; reducing a dimensionality of the specified data, based on dimensionality reduction information for an associated reduced dimensionality cluster; and searching, based on the indexes and a reduced dimensionality specified data, for a reduced dimensionality version of the cluster matching the specified data. An example of the clustering information could be an identifier of a centroid of the cluster associated with a unique label.

If the index construction method used was recursive, then the dimension reduction and clustering information can also be used to locate the cluster where the target vector resides. An example of an exact search in a hierarchy of reduced dimensionality indexes includes the steps of: recursively applying the associating and reducing steps until a corresponding lowest level of a hierarchy of reduced dimensionality clusters has been reached; and searching, using low dimensionality reduction information for reduced dimensionality specified data, in response to the reducing step; and retrieving from the identified cluster, using the multidimensional index and the dimensionality reduction information for reduced dimensionality specified data, the records most similar to the specified data.

In another embodiment, where a dimensionality reduction step has been applied as an initial step in an index created for a database, an exact or similarity search includes an additional initial step of: reducing the dimensionality of specified data, based on dimensionality reduction information for the database.

In yet another embodiment, wherein the specified data includes a search template, the dimension reduction includes the steps of: projecting the specified data onto a subspace for an associated cluster, based on dimensionality reduction information for the identified cluster; and generating dimensionality reduction information including an orthogonal complement for projected specified data, in response the projecting step. The projecting step can include producing a projected template and template dimensionality reduction information; the searching step, via the index, can be based on the projected template and the template dimensionality reduction information; and a k-nearest neighbor set of the k records most similar to the search template can be accordingly updated.

The present invention has also features for assessing if other clusters can contain elements that are closer to the specific data than the farthest of the k most similar element retrieved. As is known in the art, clustering information can be used to reconstruct the boundaries of the partitions, and these boundaries can be used to determine if a cluster can contain one of the k nearest neighbors. Those skilled in the art will appreciate that the cluster boundaries are a simple approximation to the structure of the cluster itself, namely, from the mathematical form of the dimensional indexes to the lowest level of the hierarchy, for a reduced dimensionality version of the cluster matching the specified data.

Depending on the exact spatial indexing technique used within each individual cluster, the target vector can then be retrieved by using the corresponding indexing mechanism. For example, conventional multidimensional spatial indexing techniques, including but not limited to the R-tree can be used for indexing within each cluster. Alternatively, the intra-cluster search mechanism could be a brute force or linear scan if no spatial indexing structure can be utilized.

In a preferred embodiment, the dimension reduction step is a singular value decomposition, and the index is searched for a matching reduced dimensionality cluster, based on decomposed specified data. An example of the dimensionality reduction information is a transformation matrix (including eigenvalues and eigenvectors) generated by a singular value decomposition and selected eigenvalues of the transformation matrix.

An example of an exact search wherein the specified data includes a search template, includes the steps of: identifying the search template with the cluster, based on the clustering information; projecting the search template onto a subspace for an identified cluster, based on the dimensionality reduction information; and performing an intra-cluster search for a projected template.

The present invention also has features for performing similarity searches on reduced dimensionality indexes to multidimensional data. An example of a search for k records most similar to specified data (such as a user-provided example or a template record), using one or more reduced dimensionality indexes, includes the steps of: identifying the specified data with a cluster, based on the clustering information; reducing the dimensionality of the specified data, based on the dimensionality reduction information for an identified cluster; generating boundary it is not possible to tell whether there are elements of clusters near any given position on the boundary. As an example consider a case where the database contains two spherical clusters of data, and the two clusters are extremely distant from each other. A reasonable boundary for this case would be a hyperplane, perpendicular to the line joining the centroids of the clusters, and equidistant from the centroids. Since the clusters are widely separated, there is no data point near the boundary. In other cases, the boundary could be very close to large number of elements of both clusters.

The present invention has also features to determine if a cluster could contain one or more of the k-nearest neighbors of specified data, using a hierarchy of approximations to the actual geometric structure of each cluster, comprising the steps of: retaining the cluster if it can contain any of the k-nearest neighbors of specified data based on the cluster boundaries, and discarding it otherwise; if the cluster has been retained, decide if it could contain any of the k-nearest neighbors, based on the first approximation to the geometry and discard it otherwise; iteratively applying the previous step until the cluster is discarded or accepted at the finest level of the approximation hierarchy. If the cluster has not been discarded at the end of the procedure, it is declared a candidate for containing some of the k-nearest neighbors of the given data.

In a preferred embodiment, the present invention is stored on a program storage device readable by a machine which uses one or more reduced dimensionality indexes to multidimensional data. The program storage device tangibly embodies it program of instructions in accordance with the present invention and executable by the machine to perform method steps for an exact search for specified data using the one or more indexes, where the method steps include the steps of: associating specified data to a cluster, based on clustering information; reducing a dimensionality of the specified data, based on dimensionality reduction information for an associated reduced dimensionality cluster; and searching, based on the indexes and a reduced dimensionality specified data, for a reduced dimensionality version of the cluster matching the specified data.

BRIEF DESCRIPTION OF THE DRAWINGS

These and other features and advantages of the present invention will become apparent from the following detailed description, taken in conjunction with the accompanying drawings, wherein.

DETAILED DESCRIPTION

Figure 1:
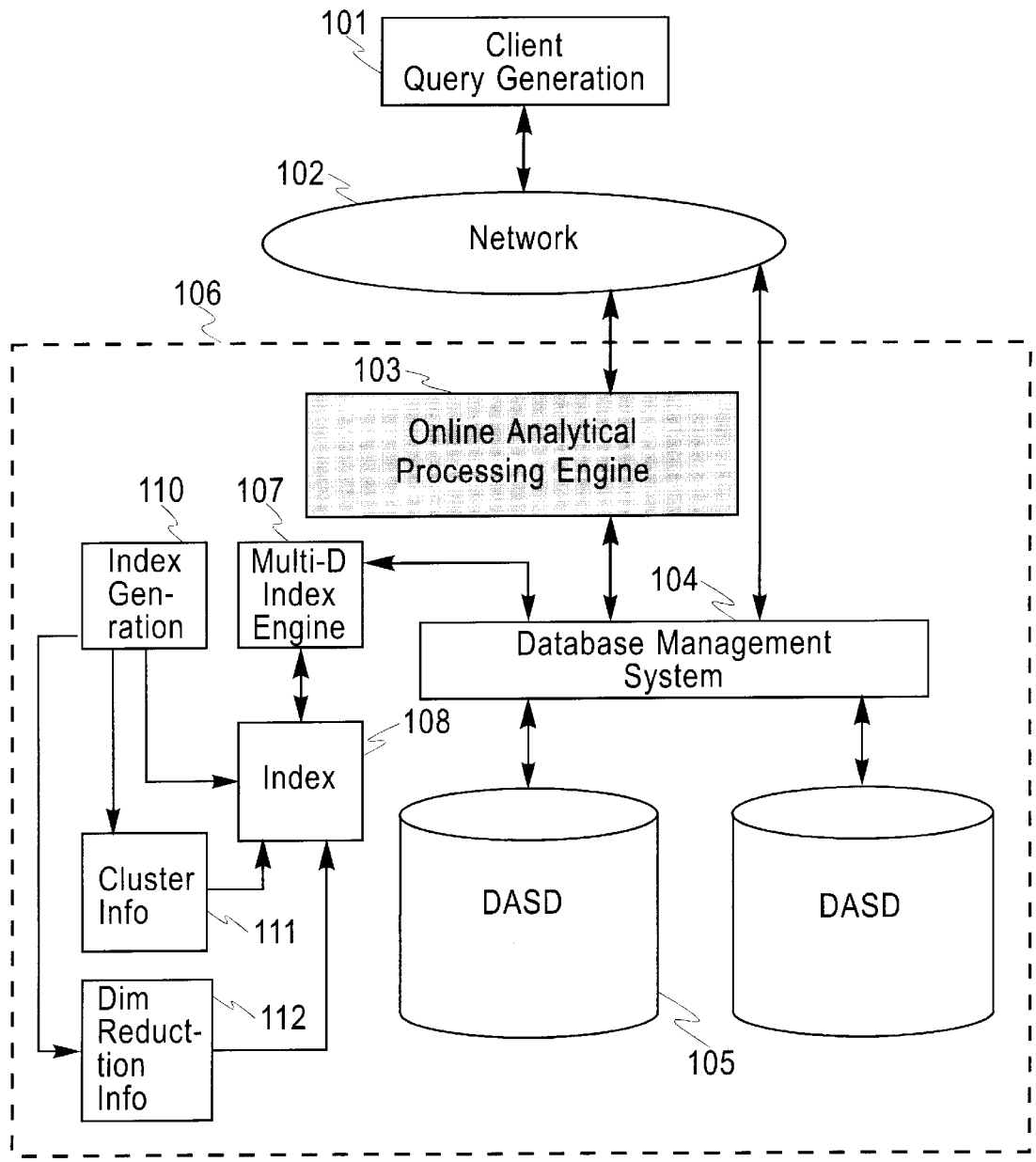
FIG. 1 shows an example of a block diagram of a networked client/server system.

FIG. 1 depicts an example of a client/server architecture having features of the present invention. As depicted, multiple clients (101) and multiple servers (106) are interconnected by a network (102). The server (106) includes a database management system (DBMS) (104) and direct access storage device (DASD) (105). A query is typically prepared on the client (101) machine and submitted to the server (106) through the network (102). The query typically includes specified data, such as a user provided example or search template, and interacts with a database management system (DBMS) (104) for retrieving or updating a database stored in the DASD (105). An example of a DBMS is that sold by IBM under the trademark DB2.

According to one aspect of the present invention, queries needing multidimensional, e.g., spatial indexing (including range queries and nearest neighbor queries) will invoke the multidimensional indexing engine (107). The multidimensional indexing engine (107) (described with reference to FIGS. 8–11) is responsible for retrieving those vectors or records which satisfy the constraints specified by the query based on one or more compact multidimensional indexes (108) and clustering (111) and dimensionality reduction information (112) generated by the index generation logic (110) of the present invention (described with reference to FIGS. 6 and 7). Most if not all of the compact indexes (108) of the present invention can preferably be stored in the main memory and/or cache of the server (106). Those skilled in the art will appreciate that a database, such as a spatial database, can reside on one or more systems. Those skilled in the art will also appreciate that the multidimensional indexing engine (107) and/or the index generation logic (110) can be combined or incorporated as part of the DBMS (104). The efficient index generation logic (110) and the multidimensional index engine (also called search logic) can be tangibly embodied as software on a computer program product executable on the server (106).

One example of an application is for stored point-of-sale transactions of a supermarket including geographic coordinates (latitude and longitude) of the store location. Here, the server (106) preferably can also support decision support types of applications to discover knowledge or patterns from the stored data. For example, an online analytical processing (OLAP) engine (103) may be used to intercept queries that are OLAP related, to facilitate the r processing. According to the present invention, the OLAP engine, possibly in conjunction with the DBMS, uses the multidimensional index engine (107) to search the index (108) for OLAP related queries. Those skilled in the art will appreciate that the index generation logic (110) of the present invention is applicable to multidimensional data cube representations of a data warehouse. An example of a method and system for generating multidimensional data cube representations of a data warehouse is described in co-pending U.S. patent application Ser. No. 08/843,290, filed Apr. 14, 1997, entitled "System and Method for Generating Multi-Representations of a Data Cube," by Castelli et al., which is hereby incorporated by reference in its entirety.

Multimedia data is another example of data that benefits from spatial indexing. Multimedia data such as audio, video and images can be stored separately from the meta-data used for indexing. One key component of the meta data that can be used for facilitating the indexing and retrieval of the media data are the feature vectors extracted from the raw data. For example, a texture, color histogram and shape can be extracted from regions of the image and be used for constructing indices (108) for retrieval.

An example of an image mining application is QBIC, which is the integrated search facility in IBM's DB2 Image Extender. QBIC includes an image query engine (server), and a sample client consisting of an HTML graphical user interface and related common gateway interface (CGI) scripts that together form the basis of a complete application. Both the server and the client are extensible so that a user can develop an application-specific image matching function and add it to QBIC. The image search server allows queries of large image databases based on visual image content. It features:

Querying in visual media. "Show me images like this one", where you define what "like" means in terms of colors, layout, texture, and so on.

Ranking of images according to similarity to the query image.

Automatic indexing of images, where numerical descriptors of color and texture are stored. During a search, these properties are used to find similar images The combination of visual queries with text queries or queries on parameters such as a date.

Similarly, indexes can be generated by first creating a representation of the database to be indexed as a set of vectors, where each vector corresponds to a row in the database and the elements of each vector correspond to the values, for the particular row contained in the columns for which an index must be generated.

Creating a representation of the database as a set of vectors is well known in the art. The representation can be created by, but is not limited to: creating for each row of the database an array of length equal to the dimensionality of the index to be generated; and copying to the elements of the array, the values contained in the columns, of the corresponding row, for which the index must be generated.

Assuming that the ith element of a vector v is $v_i$, the vector v can then be expressed as $$v = [v_1 \ldots v_N] \quad (1)$$

where 'N' is the number of dimensions of the vector that is used for indexing.

The client side can usually specify three types of queries, all of which require some form of spatial indexing, as described in the Background:

(1) Exact queries: where a vector is specified and the records or multimedia data that match the vector will be retrieved;

(2) Range queries: where the lower and upper limit of each dimension of the vector is specified.

(3) Nearest neighbor queries: where the most "similar" vectors are retrieved based on a similarity measure.

The most commonly used similarity measure between two vectors, v1 and v2, is the Euclidean distance measure, d, defined as $$d^2 = \Sigma (v1_i - v2_i)^2 \quad (2).$$

Note that it is not necessary for all of the dimensions i to participate in the computation of either a range or nearest neighbor query. In both cases, a subset of the dimensions can be specified to retrieve the results.

Figure 2:
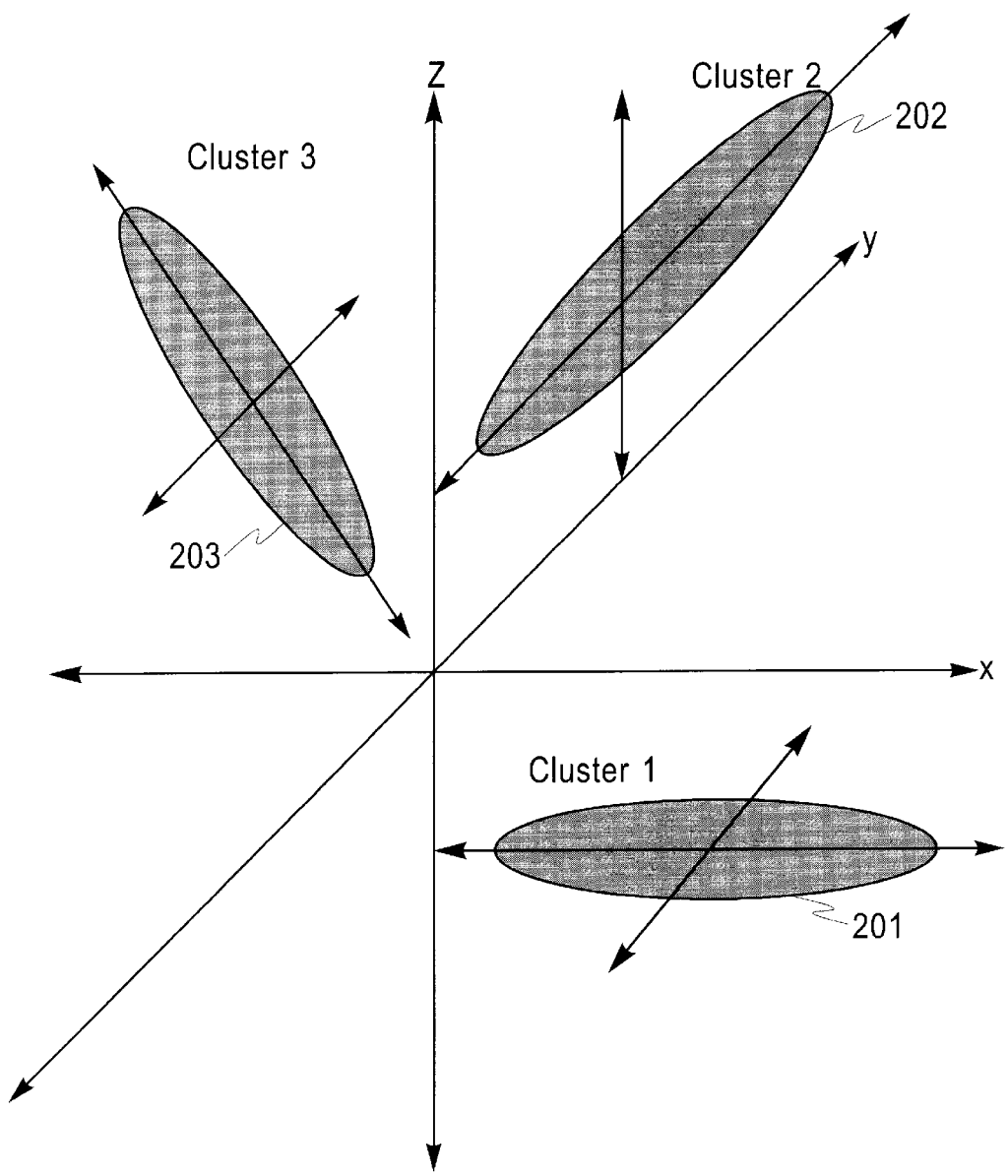
FIG. 2 shows an example of the distribution of the data points and intuition for dimension reduction after clustering.

FIG. 2 shows an example of the distribution of the vectors in a multidimensional space. As depicted, a total of three dimensions are required to represent the entire space. However, only two dimensions are required to represent each individual cluster, as cluster 201, 202, and 203 are located on the x-y, y-z, and z-x planes, respectively. Thus, it can be concluded that dimension reduction can be achieved through proper clustering of the data. The same dimensional reduction cannot be achieved by singular value decomposition alone, which can only re-orient the feature space so that the axis in the space coincides with the dominant dimensions (three in this example).

Eliminating one or more dimensions of a vector is equivalent to projecting the original points into a subspace. Equation (2) shows that only those dimensions where the individual elements in the vector are different, need to be computed. As a result, the projection of the vector into a subspace does not affect the computation of the distance, providing those elements that are eliminated do not vary in the original space.

Figure 3:
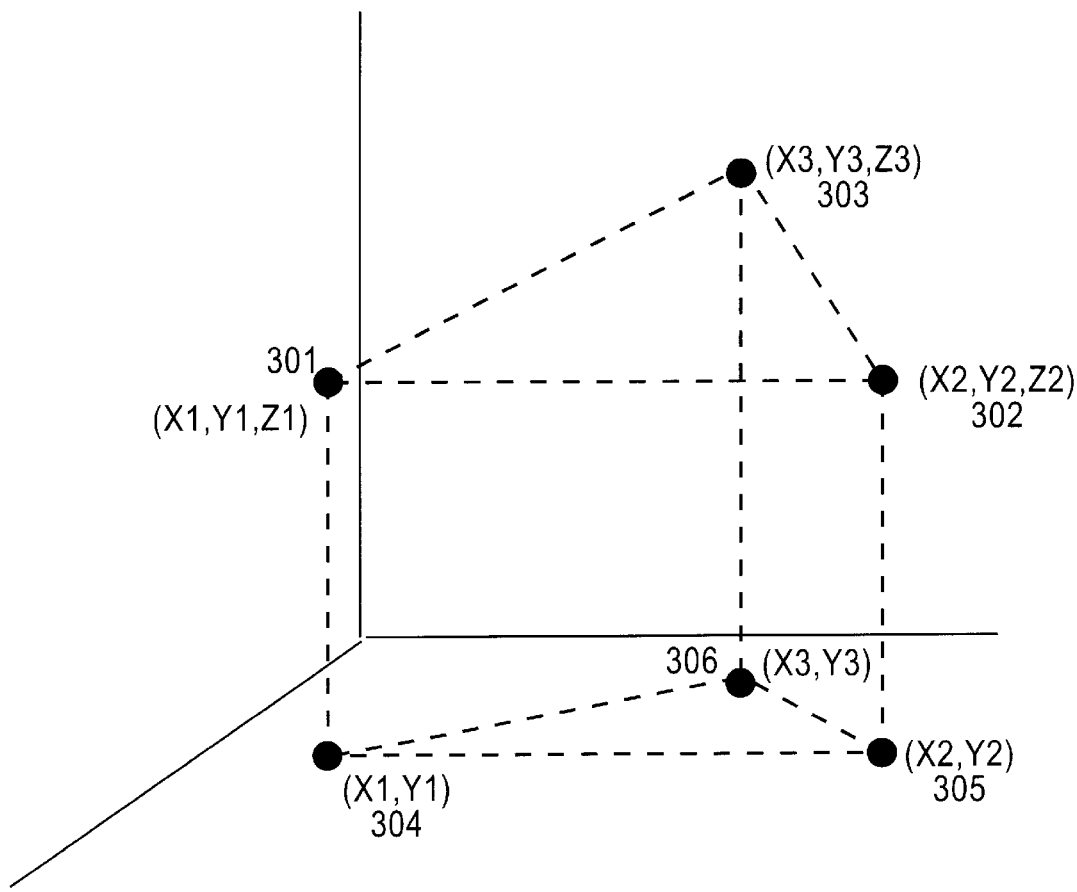
FIG. 3 shows an example of projecting three points in a 3-D space into a 2-D space such that the projection preserves the relative distance between any two points of the three points.

FIG. 3 shows an example of a distance computation in the original space and a projected subspace where the projection preserves the relative distance between any two of the three points. As shown, in the original 3-dimensional (3-D) space, a point (301) is more distant from another point (302) than it is from a third point (303). Here, the projections of these points (304, 305 and 306 respectively) into the 2-dimensional (2-D) subspace, preserves the relative distance between points.

Figure 4:
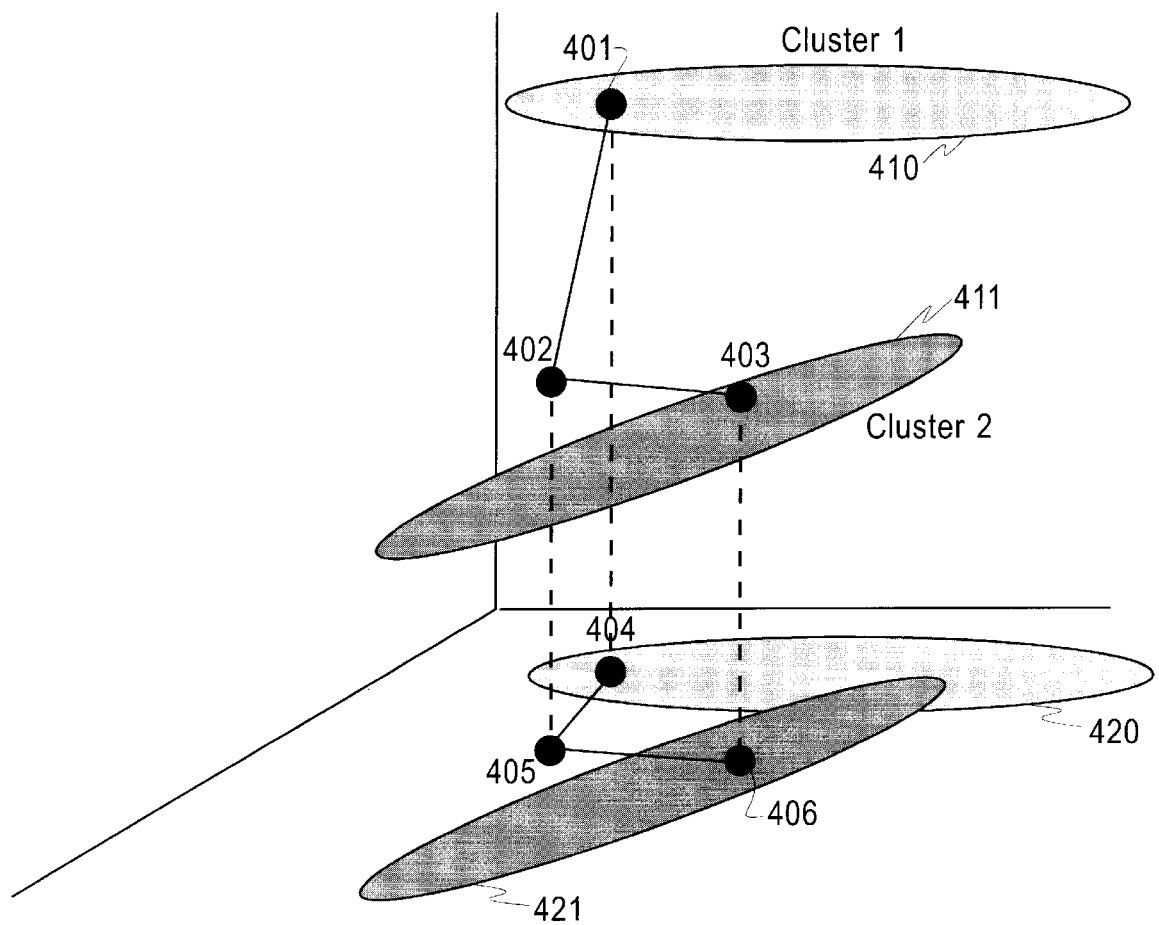
FIG. 4 shows an example of projecting three points in a 3-D space into a 2-D space where the rank of the relative distance is affected by the projection.

FIG. 4 shows an example of projecting three points in a 3-D space into a 2-D space where the projection affects the rank of the relative distance. As shown, the distance between points (401) and (402) in the 3-D space is larger than that between points (402) and (403). In this case however, the distance between the respective projected points (404) and (405) is shorter than the projected distance between (405) and (406). Thus, the relative distance between two points may not be preserved in the projected subspace.

In the following, a methodology will be derived to estimate the maximum error that can result from projecting vectors into a subspace. The process starts by determining the bound of the maximum error. Denoting the centroid of a cluster as Vc, which is defined as $$V_c = \frac{1}{N} \sum V_i \quad (3)$$

where N is the total number of vectors in the cluster, which consists of vectors $\{V1, \ldots, VN\}$. After the cluster is projected into a k dimensional subspace, where without loss of generality the last (n-k) dimensions are eliminated, an error is introduced to the distance between any two vectors in the subspace as compared to the original space. The error term is $$Error^2 = \sum_{i=k+1}^{n} (V_{1,i} - V_{2,i})^2 \quad (4)$$

The following inequality immediately hold:

$$Error^2 \leq \sum_{i=k+1}^{n} (|V_{1,i}| + |V_{2,i}|)^2 \quad (5)$$

$$\leq \sum_{i=k+1}^{n} (2\max(|V_{1,i}|, |V_{2,i}|))^2$$

$$\leq 4 \sum_{i=k+1}^{n} \max(|V_{1,i}|, |V_{2,i}|)^2$$

Equation (5) shows that the maximum error incurred by computing the distance in the projected subspace is bounded.

Figure 5:
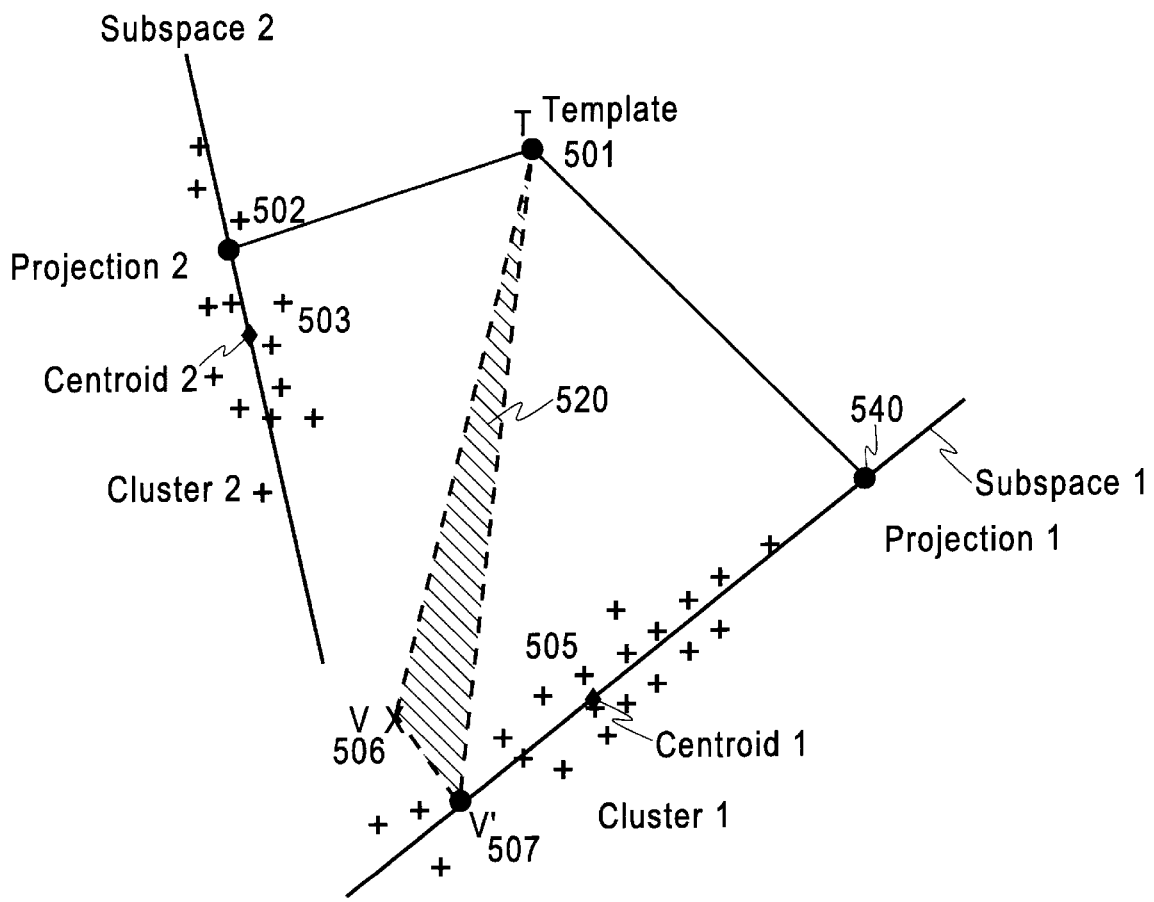
FIG. 5 shows an example of a computation of the distance between points in the original space and the projected subspace.

FIG. 5 shows an example of an approximation in computing the distances in accordance with the present invention. The distance between a template point T (501) and a generic point V (506) is given by equation 2. This Euclidean distance is invariant with respect to: rotations of the reference coordinate system; translations of the origin of the coordinate system; reflections of the coordinate axes; and the ordering of the coordinates. Let then, without loss of generality, the point V (506) belong to Cluster 1 in FIG. 5. Consider then the reference coordinate system defined by the eigenvectors of the covariance matrix of Cluster 1, and let the origin of the reference coordinate system be Centroid 1. The distance between the template T (501) and a generic point V in cluster 1 (505) can be written as $$d^2 = \sum_{i=1}^{n} (T_i - V_i)^2, \quad (6)$$

where the coordinates $T_i$ and $V_i$ are relative to the reference system. Next, project the elements of Cluster 1 (505) onto Subspace 1, by setting the last n-k+1 coordinates to 0. The distance between the template T (501) and the projection V' (507) of V (506) onto Subspace I is now $$d'^2 = \sum_{i=1}^{k} (T_i - V_i)^2 + \sum_{i=k+1}^{n} (T_i)^2 \quad (7)$$

$$= d_1^2 + d_2^2$$

The term $d_i$ is the Euclidean distance between the projection (504) of the template onto Subspace 1, called Projection 1, and the projection V' (507) of V (506) onto Subspace 1; the term $d_2$ is the distance between the template T(501) and Projection 1 (504), its projection onto Subspace 1; in other words, $d_2$ is the distance between the template T (501) and Subspace 1. The approximation introduced can now be bound by substituting equation (7) for equation (6) in the calculation of the distance between the template T (501) and the vector V (506). Elementary geometry teaches that the three points here, T (501), V (506) and V' (507), identify an unique 2-dimensional subspace (a plane). To simplify the discussion, let this plane correspond to the plane (520) shown in FIG. 5. Then the distance d defined in equation (6) is equal to the length of the segment joining T (501) and V (506), the distance d' defined in equation (7) is the length of the segment joining T (501) and V' (507). A well known theorem of elementary geometry says that the length of a side of a triangle is longer than the absolute value of the difference of the lengths of the other two sides, and shorter than their sum. This implies that the error incurred in substituting the distance d' defined in equation (7) for the distance d defined in equation (6) is less than or equal to the length of the segment joining V (506) and V' (517); thus, the error squared is bounded by $$error^2 \leq \sum_{i=k+1}^{n} (V_i)^2. \quad (8)$$

Figure 6:
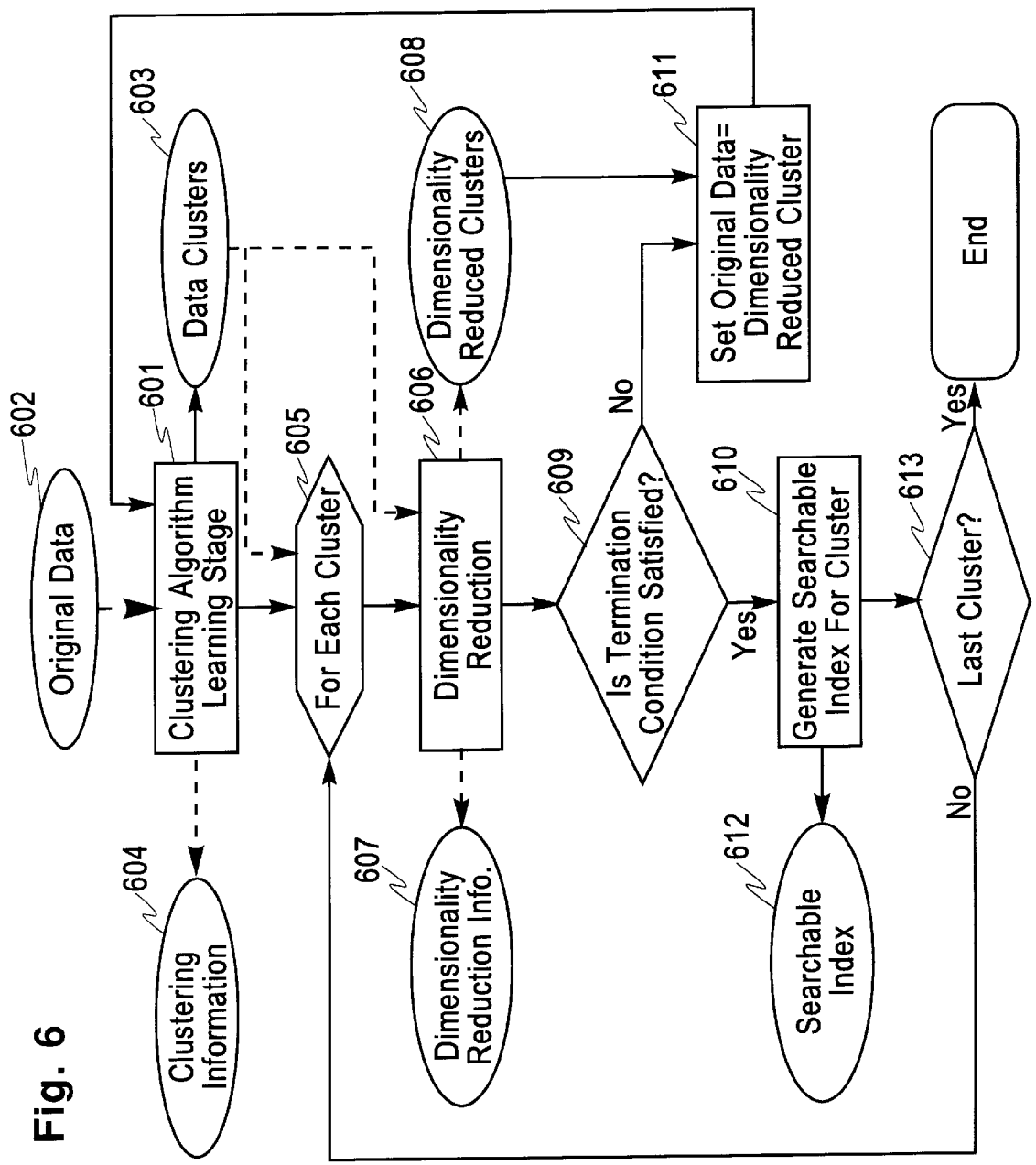
FIG. 6 shows an example of a logic flow for generating the multidimensional indexing from the data in the database.

FIG. 6 shows an example of a flow chart for generating a hierarchy of reduced dimensionality clusters and low-dimensionality indexes for the clusters at the bottom of the hierarchy. In step 601, a clustering process takes the original data (602) as input; partitions the data into data clusters (603); and generates clustering information (604) on the details of the partition. Each entry in the original data includes a vector attribute as defined in Equation (1). The clustering algorithm can be chosen among, but it is not limited to, any of the clustering or vector quantization algorithms known in the art, as taught, for example, by Leonard Kauffman and Peter J. Rousseeuw in the book "Finding Groups in Data," John Wiley & Sons, 1990; or by Yoseph Linde, Andres Buzo and Robert M. Gray in "An Algorithm for Vector Quantizer Design," published in the IEEE Transactions on Communications, Vol COM-28, No. 1, January 1980, P. 84–95. The clustering information (604) produced by the learning stage of a clustering algorithm varies with the algorithm; such information allows the classification stage of the algorithm to produce the cluster number of any new, previously unseen sample, and to produce a representative vector for each cluster. Preferably, the clustering information includes the centroids of the clusters, each associated with a unique label (see e.g., Yoseph Linde, Andres Buzo and Robert M. Gray in "An Algorithm for Vector Quantizer Design", supra) In step 605 a sequencing logic begins which controls the flow of operations so that the following operations are applied to each of the clusters individually and sequentially. Those skilled in the art will appreciate that in the case of multiple computation circuits, the sequencing logic (605) can be replaced by a dispatching logic that initiates simultaneous computations on different computation circuits, each operating on a different data cluster. In step 606, the dimensionality reduction logic (606) receives a data cluster (603) and produces dimensionality reduction information (607) and a reduced dimensionality data cluster (608). In step 609, a termination condition test is performed (discussed below). If the termination condition is not satisfied, steps 601–609 can be applied recursively by substituting, in step 611, the reduced dimensionality data cluster (608) for the original data (602)

and the process returns to step 601. If in step 610 the termination condition is satisfied, a searchable index (612) is generated for the cluster. In step 613, if the number of clusters already analyzed equals the total number of clusters (603) produced by the clustering algorithm in step 601, the computation terminates. Otherwise, the process returns to step 605. The selection of the number of clusters is usually performed by the user, but there are automatic procedures known in the art; see e.g., Brian Everitt, "Cluster Analysis," Halsted Press, 1973, Chapter 4.2.

An example of the termination condition test of step 609 can be based on a concept of data volume, V(X), defined as $$V(X) = \Sigma_{i=1}^{m} n_i$$

where X is a set of records, $n_i$ is the size of the ith record and the sum is over all the elements of X. If the records have the same size S before the dimensionality reduction step 606 and n denotes the number of records in a cluster, then the volume of the cluster is Sn. If S' denotes the size of a record after the dimensionality reduction step 606, then the volume of the cluster after dimensionality reduction is S'n. The termination condition can be tested by comparing the volumes Sn and S'n and terminating if Sn=S'n.

In another embodiment, the termination test condition in step 609 is not present and no recursive application of the method is performed.

Figure 7:
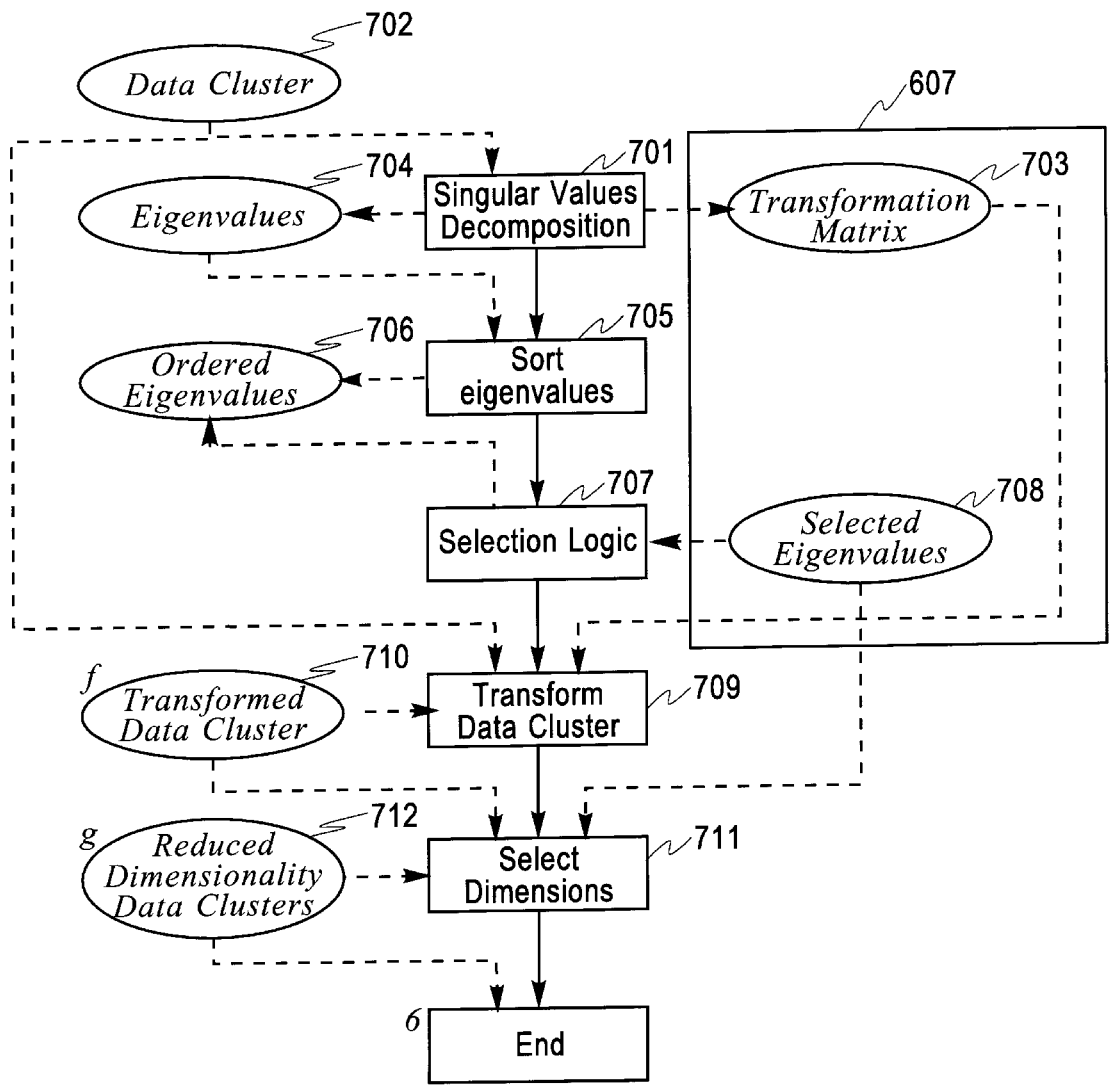
FIG. 7 shows an example of a logic flow for performing dimensionality reduction of the data.

FIG. 7 shows an example of the dimensionality reduction logic of step 606. As depicted, in step 701, a singular value decomposition logic (701) tales the data cluster (702) as input and produces a transformation matrix (703) and the eigenvalues (704) (or characteristic values) of the transformation matrix (703). The columns of the transformation matrix are the eigenvectors (or characteristic vectors) of the matrix. Algorithms for singular value decomposition are well known in the art; see e.g., R. A. Horn and C. R Johnson, "Matrix Analysis," Cambridge University Press (1985). Those skilled in the art will appreciate that the singular value decomposition logic can be replaced by any logic performing a same or equivalent operation. In an alternative embodiment, the singular value decomposition logic can be replaced by a principal component analysis logic, as is also well known in the art.

In step 705, a sorting logic takes the eigenvalues (704) as input and produces eigenvalues sorted by decreasing magnitude (706). The sorting logic can be, any of the numerous sorting logic well known in the art. In step 707, the selection logic, selects a subset of the ordered eigenvalues (706) containing the largest eigenvalues (708) according to a selection criterion. The selection criterion can be, but it is not limited to, selecting the smallest group of eigenvalues, the sum of which is larger than a user-specified percentage of the trace of the transformation matrix (703), where the trace is the sum of the elements on the diagonal, as is known in the art. In this example, the transformation matrix (703) and the selected eigenvalues (708) comprise dimensionality reduction information (607). Alternatively, the selection of the eigenvalues can be based on a precision vs. recall tradeoff (described below).

In step 709, the transformation logic takes the data cluster (702) and the transformation matrix (703) as input; and applies a transformation specified by the transformation matrix (703) to the elements of the data cluster (702) and produces a transformed data cluster (710). In step 711, the selected eigenvalues (708) and the transformed data cluster (710) are used to produce the reduced dimensionality data cluster (712). In a preferred embodiment, the dimensionality reduction is accomplished by retaining the smallest number of dimensions such that the set of corresponding eigenvalues account for at least a fixed percentage of the total variance, where for instance the fixed percentage can be taken to be equal to 95%.

Alternatively, the selection of the eigenvalues can be based on a precision vs. recall tradeoff. To understand precision and recall, it is important to keep in mind that the search operation performed by a method of the current invention can be approximate, (as will be described with reference to FIGS. 10–11). Let k be the desired number of nearest neighbors to a template in a database of N elements. Here, since the operation is approximate, a user typically requests a number of returned results greater than k. Let n be the number of returned results; of the n results, only c will be correct, in the sense that they are among the k nearest neighbors to the template. The precision is the proportion of the returned results that are correct, and is defined as $$\text{precision} = c/n,$$

and recall is the proportion of the correct results that are returned by the search, that is, $$\text{recall} = c/k.$$

Since precision and recall vary with the choice of the template, their expected values are a better measure of the performance of the system. Thus, both precision and recall are meant as expected values (E) taken over the distribution of the templates, as a function of fixed values of n and k:

$$\text{precision} = E(c)/n,$$

$$\text{recall} = E(c)/k.$$

Note that as the number of returned results n increases, the precision decreases while the recall increases. In general, the trends of precision and recall are not monotonic. Since E(c) depends on n, an efficiency vs. recall curve is often plotted as a parametric function of n. In a preferred embodiment, a requester specifies the desired precision of the search and a lower bound on the allowed recall. Then the dimensionality reduction logic performs the dimensionality reduction based on precision and recall as follows: after ordering the eigenvalues in decreasing order, the dimensionality reduction logic (step 606, FIG. 6) removes the dimension corresponding to the smallest eigenvalue, and estimates the resulting precision vs. recall function based on a test set of samples selected at random from the original training set or provided by the user. From the precision vs. recall function, the dimensionality reduction logic derives a maximum value of precision $n_{max}$ for which the desired recall is attained. Then the dimensionality reduction logic iterates the same procedure by removing the dimension corresponding to the next smallest eigenvalue, and computes the corresponding precision for which the desired recall is attained. The iterative procedure is terminated when the computed precision is below the threshold value specified by the user, and the dimensionality reduction logic retains only the dimensions retained at the iteration immediately preceding the one where the termination condition occurs.

In another embodiment of the present invention, the requester specifies only a value of desired recall, and the dimensionality reduction logic estimates the cost of increasing the precision to attain the desired recall. This cost has two components: one that decreases with the number of dimensions, since computing distances and searching for nearest neighbors is more efficient in lower dimensionality spaces; and an increasing component due to the fact that the number of retrieved results must grow as the number of retained dimensions is reduced to insure the desired value of recall. Retrieving a larger number n of nearest neighbors is more expensive even when using efficient methods, since the portion of the search space that must be analyzed grows with the number of desired results. Then the dimensionality reduction logic finds by exhaustive search, the number of dimensions to retain that minimizes the cost of the search for the user-specified value of the recall.

The clustering and singular value decomposition can be applied to the vectors recursively (step 601–611) until a terminating condition (step 609) is reached. One such terminating condition can be that the dimension of each cluster can no longer be reduced as described herein. Optionally, more conventional spatial indexing techniques such as the R-tree can then be applied to each cluster. These techniques are much more efficient for those clusters whose dimension have been minimized. This would thus complete the entire index generation process for a set of high dimensional vectors.

As will be described with reference to FIGS. 8–15, the present invention also has features for performing efficient searches using compact representations of multidimensional data. Those skilled in the art will appreciate that the search methods of the present invention are not limited to the specific compact representations of multidimensional (data described herein.

Figure 8:
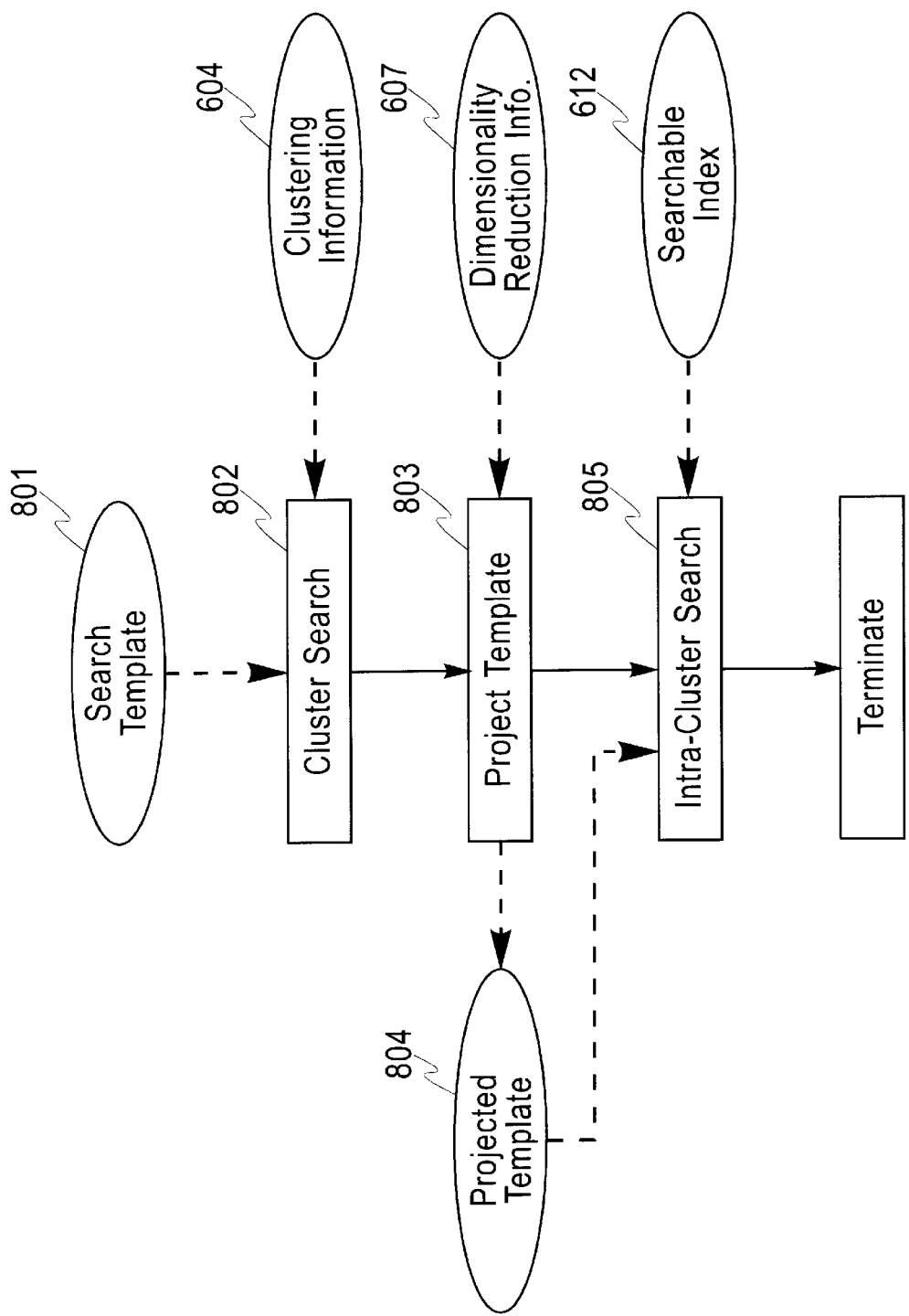
FIG. 8 shows an example of logic flow for an exact search using the index generated without recursive decomposition and clustering.

FIG. 8 shows an example of a logic flow for an exact search process based on a searchable index (108 or 612) generated according to the present invention. In this example, the index is generated without recursive application of the clustering and singular value decomposition. An exact search is the process of retrieving a record or records that exactly match a search query, such as a search template. As depicted, in step 802 a query including specified data such as a search template (801) is received by the multidimensional index engine (107) (also called cluster search logic). In step 802, the clustering information (604) produced in step 601 of FIG. 6, is used to identify the cluster to which the search template belongs. In step 803, the dimensionality reduction information (607) produced in step 606 of FIG. 6, is used to project the input template onto the subspace associated with the cluster identified in step 802, and produce a projected template (804). In step 805, an intra-cluster search logic uses the searchable index (612) generated in step 610 of FIG. 6 to search for the projected template. Note that the simplest search mechanism within each cluster is to conduct a linear scan (or linear search) if no spatial indexing structure can be utilized. On most occasions, spatial indexing structures such as R-trees can offer better efficiency (as compared to linear scan) when the dimension of the cluster is relatively small (smaller than 10 in most cases).

Figure 9:
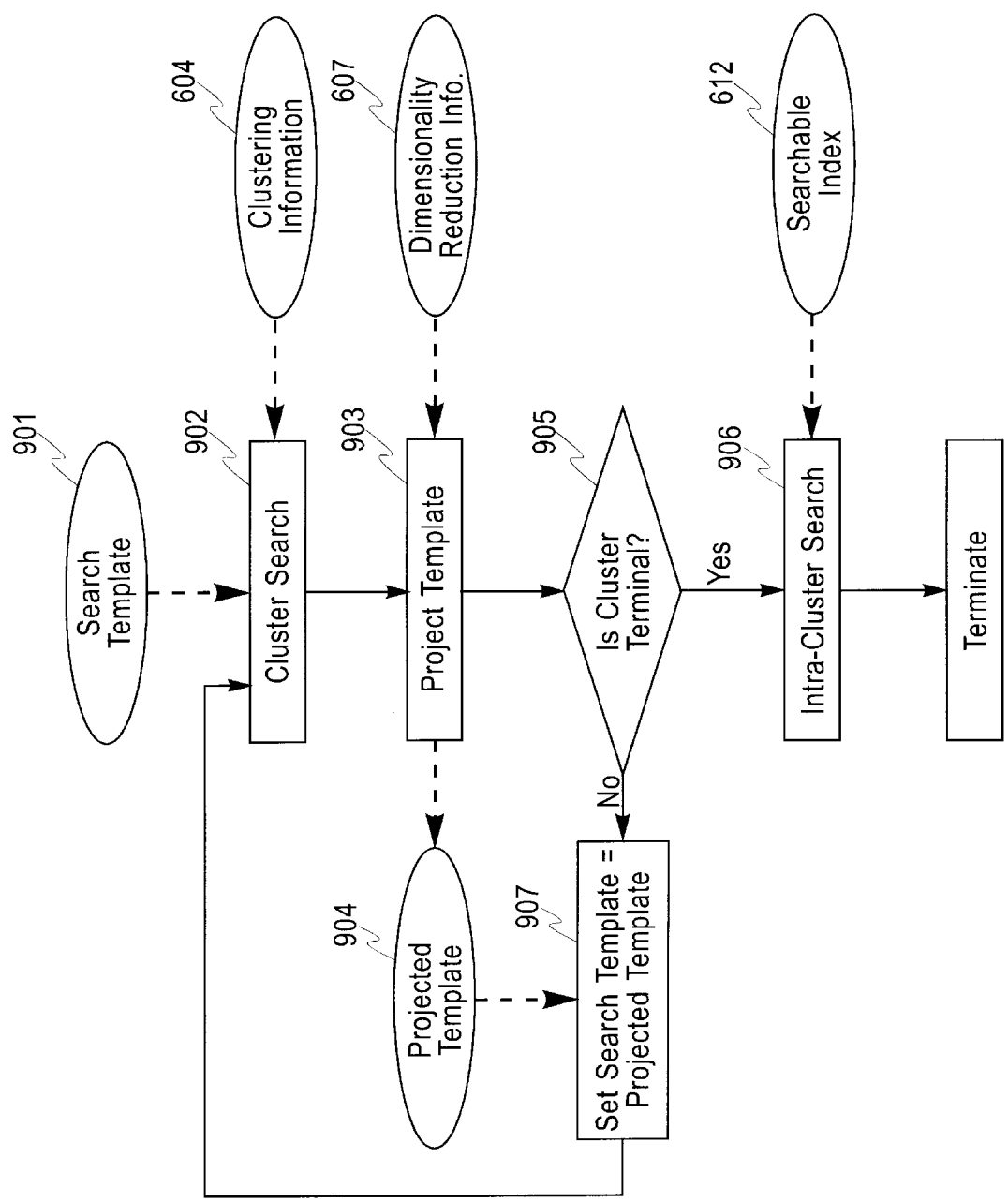
FIG. 9 shows an example of logic flow for an exact search using the index generated with recursive decomposition and clustering.

FIG. 9 shows another example of a flow chart of an exact search process based on a searchable multidimensional index (108 or 612) generated according to the present invention. Here, the index (108 or 612) was generated with a recursive application of the clustering and dimensionality reduction logic. An exact search is the process of retrieving the record or records that exactly match the search template. As depicted, a query including specified data such as a search template (901) is used as input to the cluster search logic, in step 902, which is analogous to the cluster search logic in step 802 of FIG. 8. In step 902, clustering information (604) produced in step (601) of FIG. 6 is used to identify the cluster to which the search template (901) belongs. In step 903, (analogous to step 803 of FIG. 8) the dimensionality reduction information (607), produced in step 606 of FIG. 6, is used to project the input template onto the subspace associated with the cluster identified in step 902, and produce a projected template (904). In step 905, it is determined whether the current cluster is terminal, that is, if no further recursive clustering and singular value decomposition steps were applied to this cluster during the multi-dimensional index construction process. If the cluster is not terminal, in step 907 the search template (901) is replaced by the projected template (904), and the process returns to step 902. In step 906, if the cluster is terminal, the intra-cluster search logic uses the searchable index to search for the projected template. As noted, the simplest intra-cluster search mechanism is to conduct a linear scan (or linear search), if no spatial indexing structure can be utilized. On most occasions, spatial indexing structures such as R-trees can offer better efficiency (as compared to linear scan) when the dimension of the cluster is relatively small (smaller than 10 in most cases).

The present invention has also features for assessing if other clusters can contain elements that are closer to the specific data than the farthest of the k most similar elements retrieved. As is known in the art, clustering information can be used to reconstruct the boundaries of the partitions, and these boundaries can be used to determine if a cluster can contain one of the k nearest neighbors. Those skilled in the art will appreciate that the cluster boundaries are a simple approximation to the structure of the cluster itself. In other words, from the mathematical form of the boundary it is not possible to tell whether there are elements of clusters near any given position on the boundary. As an example, consider a case where the database contains two spherical clusters of data which are relatively distant from each other. A reasonable boundary for this case would be a hyperplane, perpendicular to the line joining the centroids of the clusters, and equidistant from the centroids. Since the clusters are relatively distant however, there is no data point near the boundary. In other cases, the boundary could be very close to large number of elements of both clusters.

As will be described with reference to FIGS. 14 and 15, the present invention has features computing and storing, in addition to the clustering information, a hierarchy of approximations to the actual geometric structure of each cluster, and using the approximation hierarchy to identify clusters which can contain elements closer than a fixed distance from a given vector.

Figure 10:
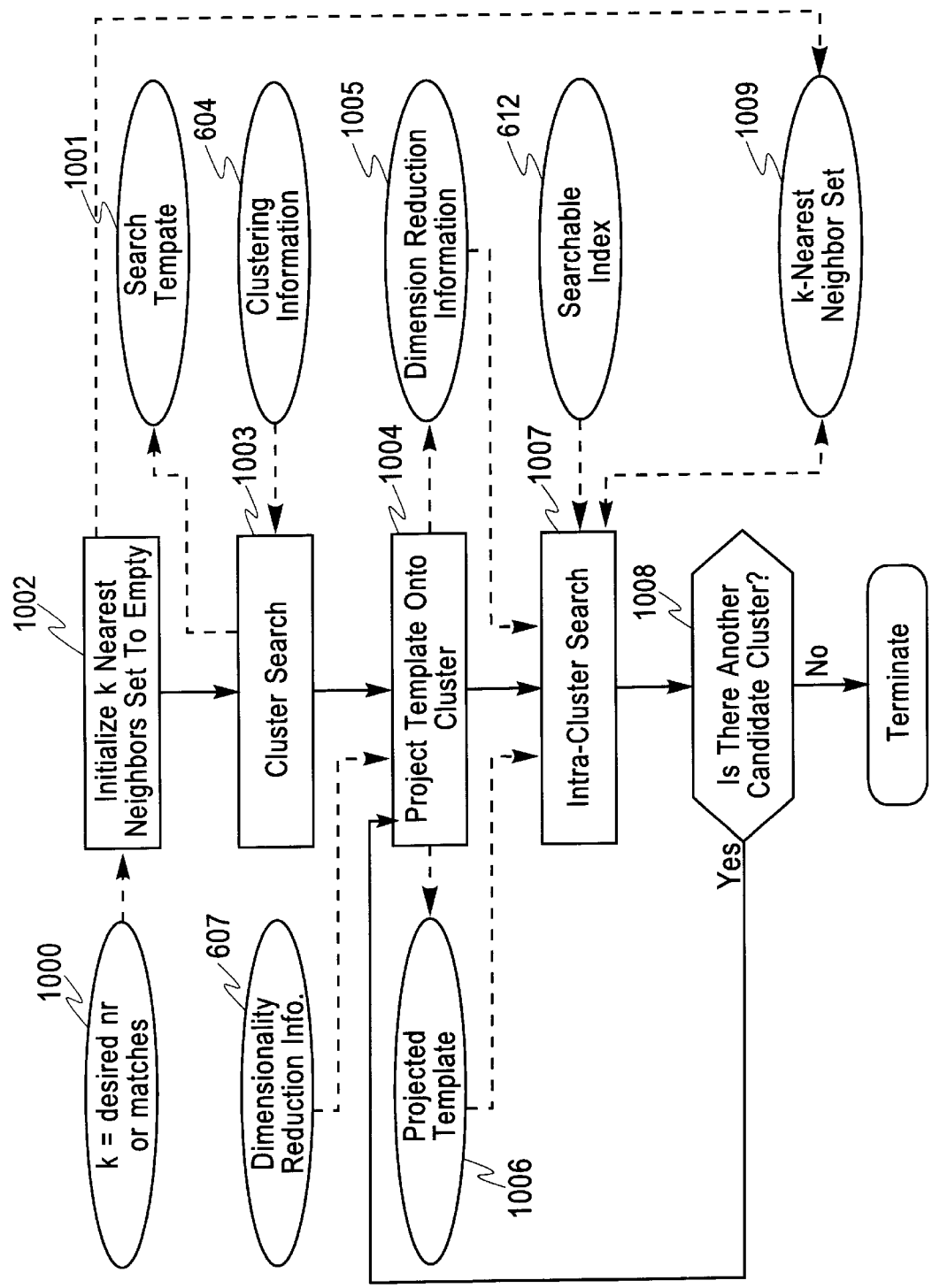
FIG. 10 shows an example of logic flow for a k-nearest neighbor search using the index generated without recursive decomposition and clustering.

FIG. 10 shows an example of a flow chart of a k-nearest neighbor search process based on an index (612) generated according to the present invention. In this example, the index is generated without recursive application of the clustering and singular value decomposition. The k-nearest neighbor search returns the k closest entries in the database which match the query. The number (nr) of desired matches, k (1000) is used in step 1002 to initialize the k-nearest neighbor set (1009) so that it contains at most k elements and so that it: is empty before the next step begins. In step 1003, the cluster search logic receives the query, for example a the search template (1001) and determines which cluster the search template belongs to, using the clustering information (604) produced in step 601 of FIG. 6. In step 1004, template is then projected onto the subspace associated with the cluster it belongs to, using the dimensionality reduction information (607). The projection step 1004 produces a projected template (1006) and dimensionality reduction information (1005), that includes an orthogonal complement of the projected template (1006) (defined as the vector difference of the search template (1001) and the projected template (1006)), and the Euclidean length of the orthogonal complement. The dimensionality reduction information (1005) and the projected template (1006) can be used by the intra-cluster search logic, in step 1007, which updates the k-nearest neighbor set (1009), using the multidimensional index. Examples of the intra-cluster search logic adaptable according to the present invention include any of the nearest neighbor search methods known in the art; see e.g., "Nearest Neighbor Pattern Classification Techniques," Belur V. Desarathy, (editor), IEEE Computer Society (1991). An example of an intra-cluster search logic (step 1007) having features of the present invention includes the steps of: first, the squared distance between the projected template (1006) and the members of the cluster in the vector space with reduced dimensionality is computed; the result is added to the squared distance between the search template (1001) and the subspace of the cluster; the final result is defined as the "sum" of the squared lengths of the orthogonal complements, (computed in step (1004) which is part of the dimensionality reduction information (1005):

$$\delta^2(\text{template, element}) = D^2(\text{projected\_template, element}) + \Sigma \|\text{orthogonal\_complement}\|^2.$$

If the k-nearest neighbor set (1009) is empty at the beginning of step 1007, then the intra-cluster search fills the k-nearest neighbor set with the k elements of the cluster that are closest to the projected template (1006) if the number of elements in the, cluster is greater than k, or with all the elements of the cluster otherwise. Each element of the k-nearest neighbor set is associated with a corresponding mismatch index $\delta^2$.

If the k-nearest neighbor set (1009) is not empty at the beginning of step 1007, then the intra-cluster search logic, in step 1007 updates the k-nearest neighbor set when an element is found whose mismatch index $\delta^2$ is smaller than the largest of the indexes currently associated with elements in the k-nearest neighbor set (1009). The k-nearest neighbor set can be updated by removing the element with largest mismatch index $\delta^2$ from the k-nearest neighbor set (1009) and substituting the newly found element for it.

If the k-nearest neighbor set (1009) contains less than k elements, the missing elements are considered as elements at infinite distance. In step 1008, it is determined whether there is another candidate cluster that can contain nearest neighbors. This step takes the clustering information (604) as input, from which it can determine the cluster boundaries. If the boundaries of a cluster to which the search template (1001) does not belong are closer than the farthest element of the k-nearest neighbor set (1009), then the cluster is a candidate. If no candidate exists, the process terminates and the content of the k-nearest neighbor set (1009) is returned as a result. Otherwise, the process returns to step 1004, where the current cluster is now the candidate cluster identified in step 1008.

Figure 11:
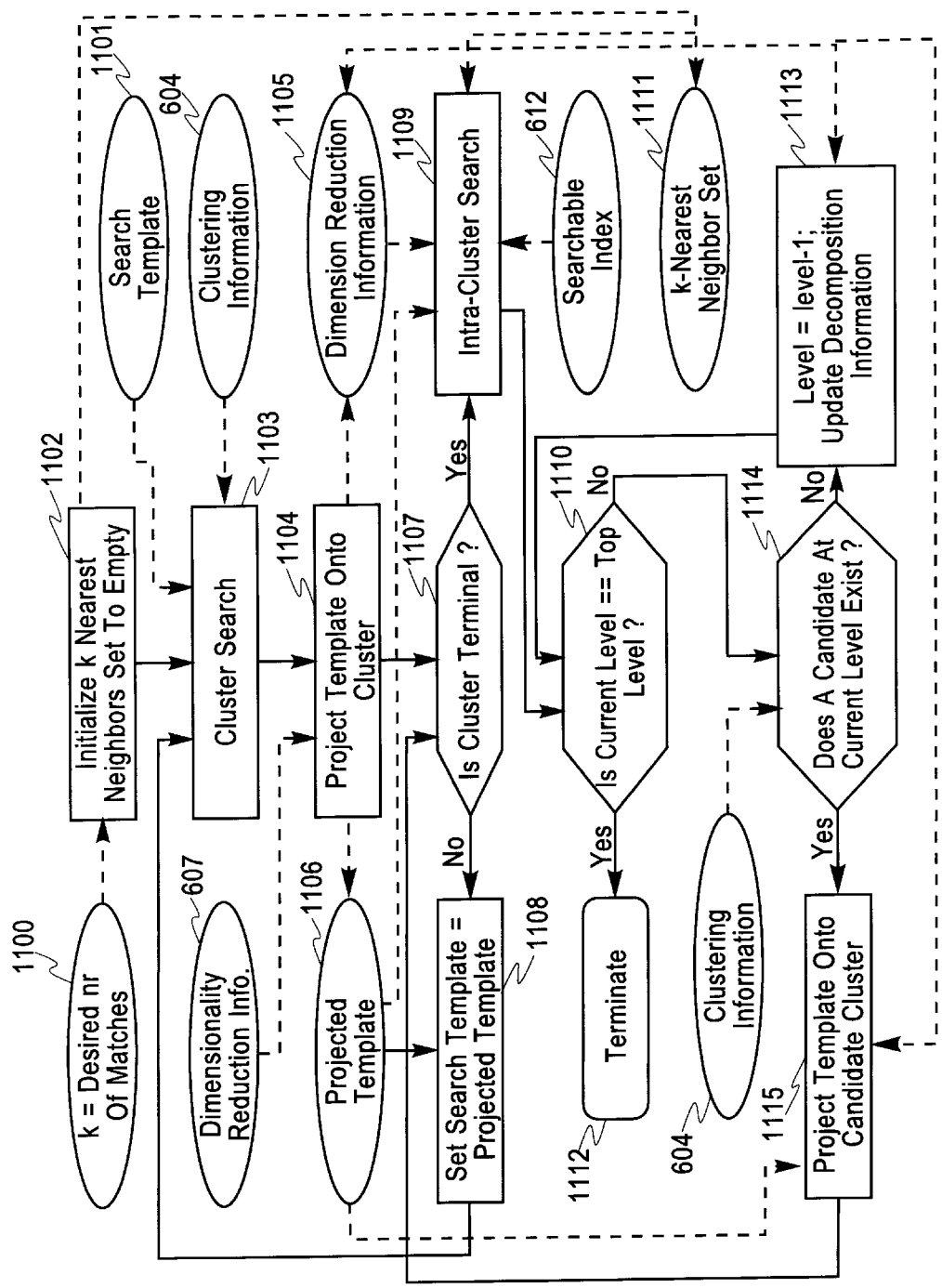
FIG. 11 shows an example of logic flow for a k-nearest neighbor search using the index generated with recursive decomposition and clustering.
Figure 12:
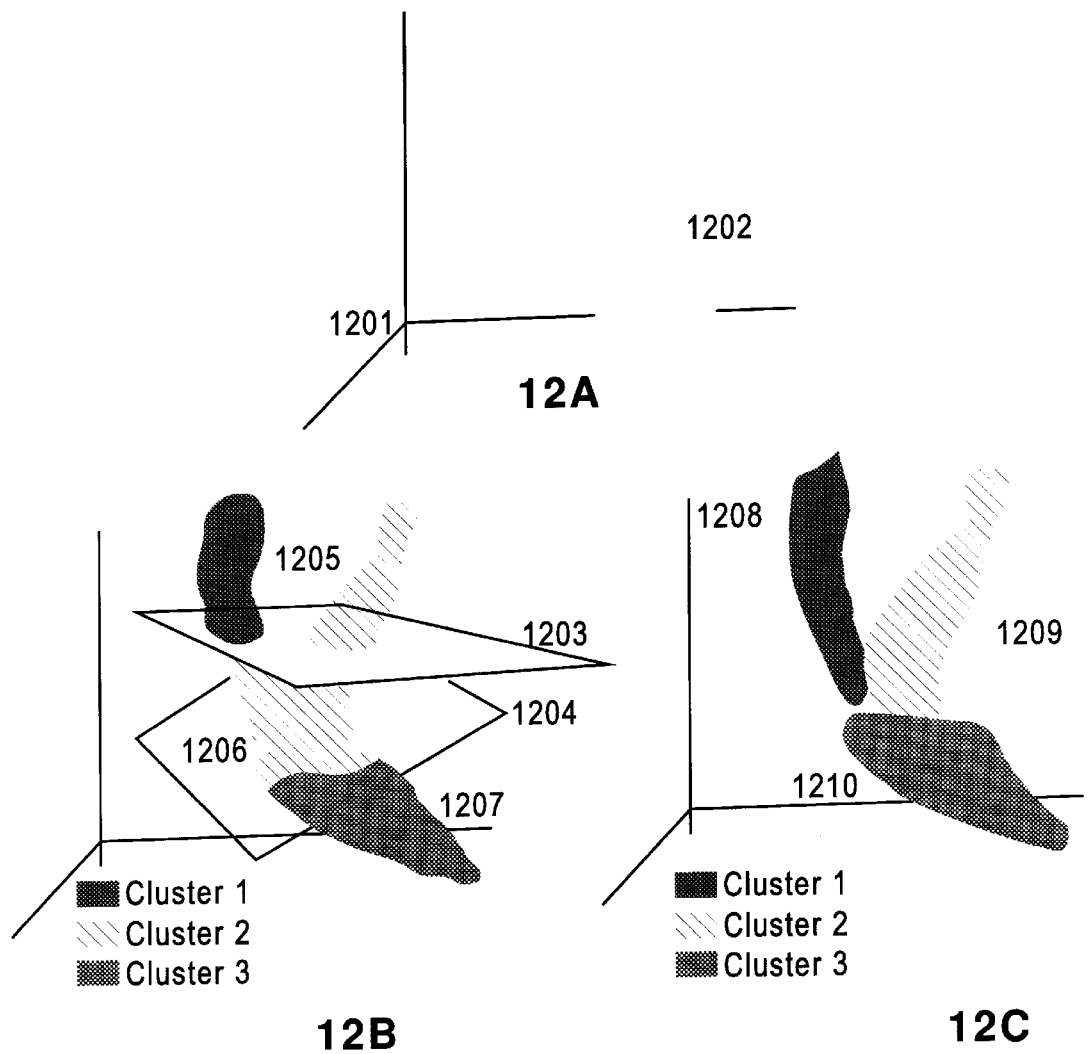
FIG. 12 shows an example of data in a 3 dimensional space, and a comparison of the results of a clustering technique based on Euclidean distance and of a clustering technique that adapts to the local structure of the data.

FIG. 11 shows an example of a flow chart of a k-nearest neighbor search process based on a search index (612) generated according to the present invention. Here, the index is generated with a recursive application of the clustering and singular value decomposition. The k-nearest neighbor search returns the closest k entries in the database, to specified data in the form of a search template. As depicted, in step 1102, the k-nearest neighbor set is initialized to empty and the number of desired matches, k (1100) is used to initialize the k-nearest neighbor set (1111) so that it can contain at most k elements. In step 1103, the cluster search logic takes the search template (1101) as input and associates the search template to a corresponding cluster, using the clustering information (604) produced in step 601 of FIG. 6. In step 1104, the template (1101) is projected onto a subspace associated with the cluster identified in step 1103, based on the dimensionality reduction information (607) produced in step 606 of FIG. 6. In step 1104, a projected template (1106) and dimensionality reduction information (1105) are produced. Preferably, the dimensionality reduction information (1105) includes the orthogonal complement of the projected template (1106) (defined as the vector difference of the search template (1101) and the projected template (1106)), and the Euclidean length of the orthogonal complement. In step 1107, it is determined if the current cluster is terminal, that is, if no further recursive steps of clustering and singular value decomposition were applied to the current cluster during the construction of the index. If the current cluster is not terminal, in step 1108 the projected template (1106) is substituted for the search template (1101) and the process returns to step 1103. Otherwise, the dimensionality reduction information (1105) and the projected template (1106) are used by the intra-cluster search logic in step 1109, to update the k-nearest neighbor set (1111), based on the searchable index (612). Examples of intra-cluster search logic which are adaptable according to the present invention include any of the nearest neighbor search methods known in the art; see e.g., "Nearest Neighbor Pattern Classification Techniques," IEEE Computer Society, Belur V. Desarathy (editor), 1991. One example of an intra-cluster search logic (step 1007) logic having features of the present invention includes the steps of: first, the squared distance between the projected template (1006) and the members of the cluster in the vector space with reduced dimensionality is computed; the result is added to the squared distance between the search template (1001) and the subspace of the cluster; the result is defined as the "sum" of the squared lengths of the orthogonal complements, (computed in step (1004) which is part of the dimensionality reduction information (1005)):

$$\delta^2(\text{template, element}) = D^2(\text{projected\_template, element}) + \Sigma \|\text{orthogonal—complement}\|^2$$

If the k-nearest neighbor set (1111) is empty at the beginning of step 1109, then the intra-cluster search logic fills the k-nearest neighbor set (1111) with either: the k elements of the cluster that are closest to the projected template (1106) if the number of elements in the cluster is greater than k, or with all the elements of the cluster if the number of elements in the cluster is equal or less than k. Each element of the k-nearest neighbor set (1111) is preferably associated with its corresponding mismatch index $\delta^2$.

If the k-nearest neighbor set (1111) is not empty at the beginning of step 1109, then the intra-cluster search logic updates the k-nearest neighbor set when an element is found whose mismatch index is smaller than the largest of the indexes currently associated with the elements in the k-nearest neighbor set (1111). The update can comprise removing the element with the largest mismatch index $\delta^2$ from the k-nearest neighbor set (1111) and substituting the newly found element for it.

If the k-nearest neighbor set (1111) contains less than k elements, the missing elements are considered as elements at infinite distance. In step 1110, it is determined whether the current level of the hierarchy is the top level (before the first clustering step is applied). If the current level is the top level, then the ends and the content of the k-nearest neighbor set (1111) is returned as a result. If the current level is not the top level, then in step 1114, a search is made for a candidate cluster at the current level, that is, a cluster that can con-ain some of the k' nearest neighbors. The search is performed using the dimensionality reduction information (1105) and the clustering information (604). In step 1114, the clustering information (604) is used to determine the cluster boundaries. If the boundaries of a cluster to which the search template (1001) does not belong are closer than the farthest element of the k-nearest neighbor set (1111), then the cluster is a candidate. If no candidate exists, then in step 1113, the current level is set to the previous level of the hierarchy and the dimensionality reduction information is updated, and the process returns to step 1110. If a candidate exists, then in step 1115, the template is projected onto the candidate cluster, thus updating the projected template (1106); and the dimensionality reduction information is updated. The process then returns to step 1117.

FIGS. 12(a)–12(c) compares the results of clustering techniques based on similarity alone (for instance, based on the minimization of the Euclidean distance between the element of each cluster and the corresponding centroids as taught by Linde, Buzo and Gray in "An Algorithm for Vector Quantizer Design," supra), with clustering using an algorithm that adapts to the local structure of the data;. FIG. 12(a) shows a coordinate reference system (1201) and a set of vectors (1202). If a clustering technique based on minimizing the Euclidean distance between the elements of each cluster and the corresponding centroid is used, a possible result is shown in FIG. 12(b): the set of vectors (1202) is partitioned into three clusters, cluster 1 (1205), cluster 2 (1206) and cluster 3 (1207) by the hyper planes (1203) and (1204). The resulting clusters contain vectors that are similar to each other, but do not capture the structure of the data, and would result in sub-optimal dimensionality reduction. FIG. 12(c) shows the results of clustering using an algorithm that adapts to the local structure of the data. This results in three clusters, cluster 1 (1208), cluster 2 (1209) and cluster 3 (1210), that better capture the local structure of the data and are more amenable to independent dimensionality reduction.

Figure 13:
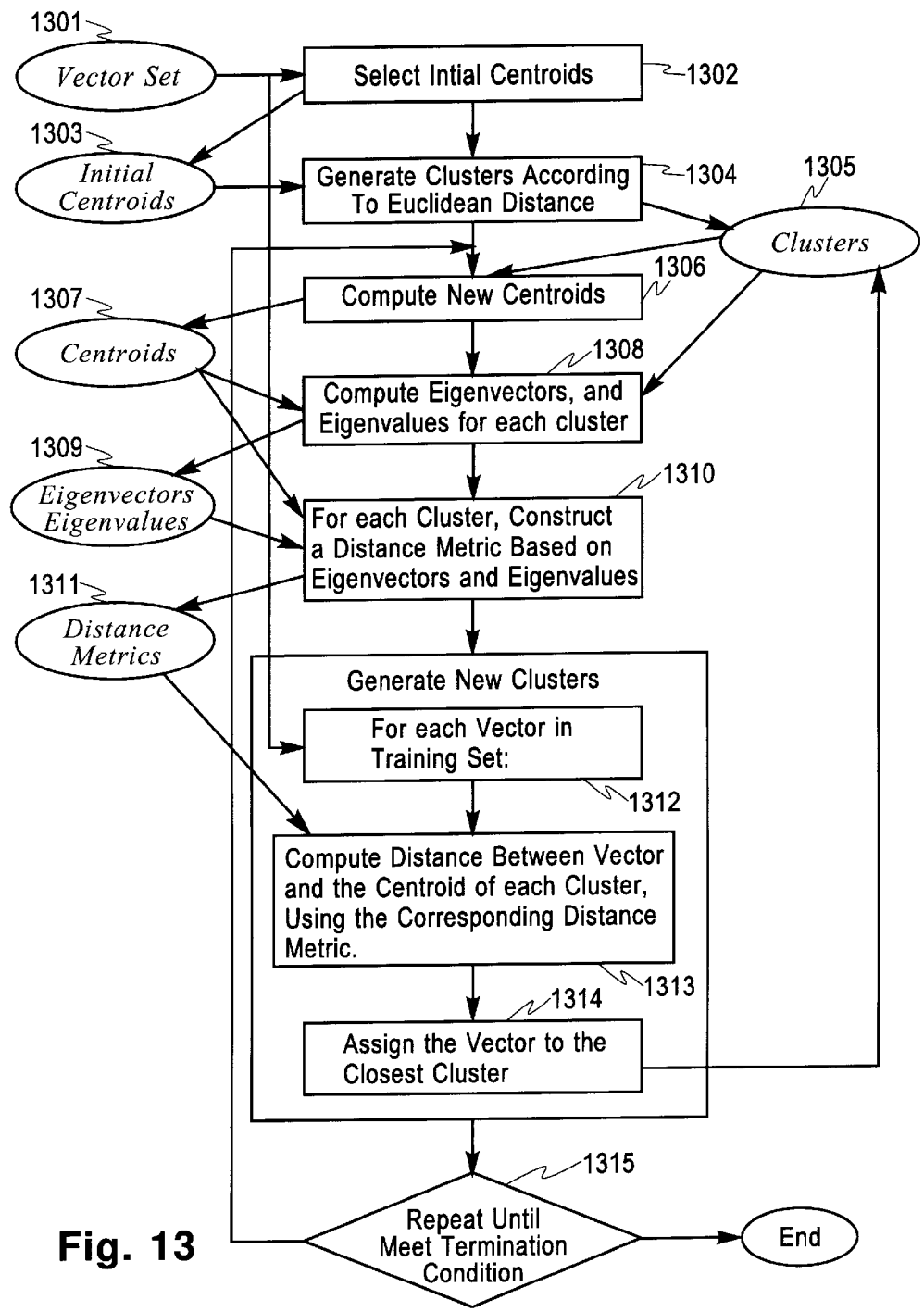
FIG. 13 shows an example of logic flow of a clustering technique that adapts to the local structure of the data.

FIG. 13 shows an example of a clustering algorithm that adapts to the local structure of the data. In step 1302, the set of vectors (1301) to be clustered and the desired number of clusters are used to select initial values of the centroid (1303). In a preferred embodiment, one element of the set of vectors is selected at random for each of the desired number NC of clusters, using any of the known sampling without replacing techniques. In step 1304, a first set of clusters is generated, for example using any of the known methods based on the Euclidean distance. As a result, the samples are divided into NC clusters (1305). In step 1306, the centroids (1307) of each of the NC clusters are computed, for instance as an average of the vectors in the cluster. In step 1308, the eigenvalues and eigenvectors (1309) of the clusters (1305) can be computed using the singular value decomposition logic (FIG. 7, step 701). In step 1310, the centroid information (1307), the eigenvectors and eigenvalues (1309) are used to produce a different distance metric for each cluster. An example of the distance metric for a particular cluster is the weighted Euclidean distance in the rotated space defined by the eigenvectors, with weights equal to the square root of the eigenvalues.

The loop formed by logic steps 1312, 1313 and 1314 generates new clusters. In step 1312, a control logic iterates step 1313 and 1314 over all the vectors iii the vector set (1301). In step 1313, the distance between the selected example vector and each of the centroids of the clusters is computed using the distance metrics (1311). In step 1314, the vector is assigned to the nearest cluster, thus updating the clusters (1305). In step 1315, if a termination condition is reached, the process ends; otherwise the process continues at step 1306. In a preferred embodiment, the computation is terminated if no change in the composition of the clusters occurs between two subsequent iterations.

Figure 14:
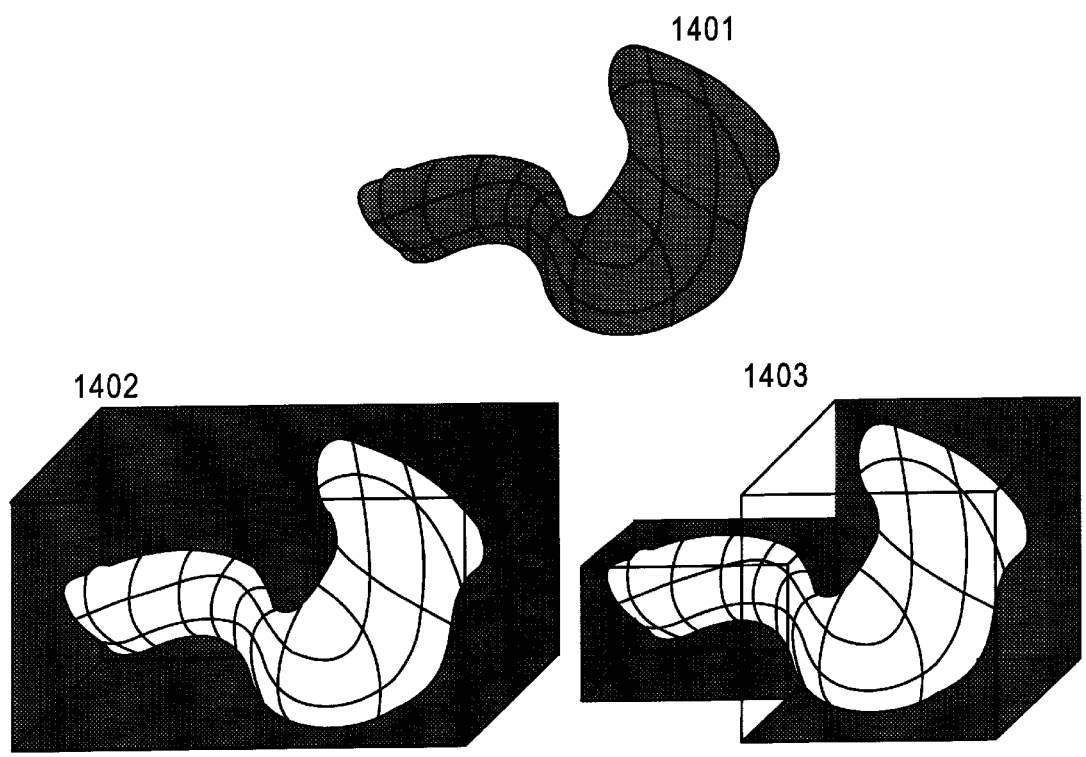
FIG. 14 shows an example of a complex hyper surface in a 3-dimensional space and two successive approximations generated using a 3-dimensional quad tree generation algorithm.

FIG. 14 shows an example of a complex surface (1401) in a 3-dimensional space and two successive approximations (1402, 1403) based on a 3-dimensional quad tree, as taught in the art by Samet, H. in "Region Representation Quadtree from Boundary Codes" Comm. ACM 23,3, pp. 163–170 (March 1980). The first approximation (1402) is a minimal bounding box. The second approximation (1403) is the second step of a quad tree generation, where the bounding box has been divided into 8 hyper rectangles by splitting the bounding box at the midpoint of each dimension, and retaining only those hyper rectangles that intersect the surface.

In a preferred embodiment, the hierarchy of approximations is generated as a k-dimensional quad tree. An example of a method having features of the present invention for generating the hierarchy of approximations includes the steps of: generating the cluster boundaries, which correspond to a zeroth-order approximation to the geometry of the clusters; approximating the convex hull of each of the clusters by means of a minimum bounding box, thus generating a first-order approximation to the geometry of each cluster, partitioning the bounding box into $2^k$ hyper rectangles, by cutting it at the half point of each dimension; retaining only those hyper rectangles that contain points, thus generating a second-order approximation to the geometry of the cluster; and repeating the last two steps for each of the retained hyper rectangles to generate successively the third-, fourth-, . . . , n-th approximation to the geometry of the cluster.

Figure 15:
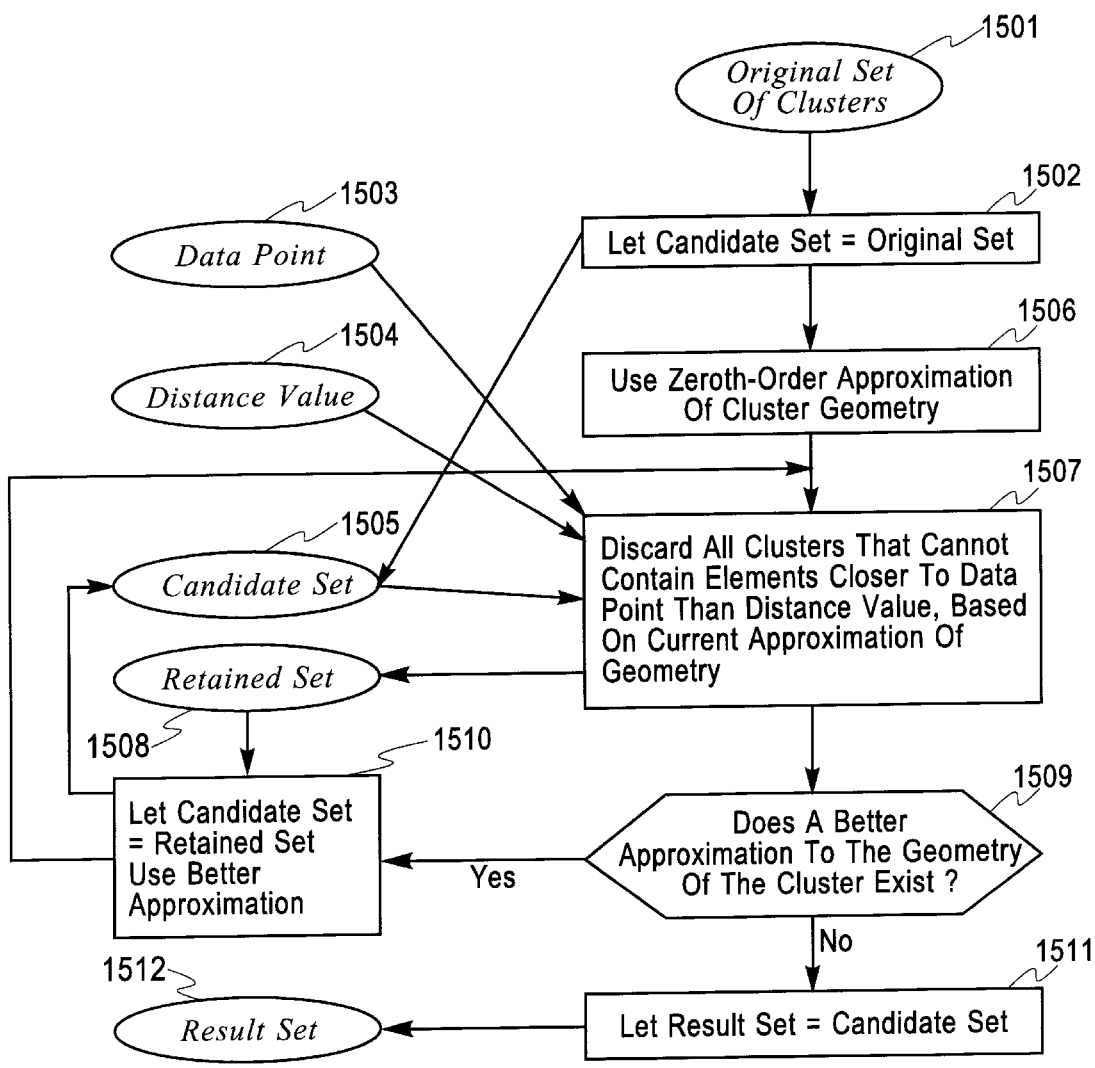
FIG. 15 shows an example of logic flow of the determination of the clusters that can contain elements closer than a fixed distance from a given vector, using successive approximations of the geometry of the clusters.

FIG. 15 shows an example of logic flow to identify clusters that can contain elements closer than a prescribed distance from a given data point, using the hierarchy of successive approximations to the geometry of the clusters. In one embodiment, the geometry of a cluster is a convex hull of the cluster. In another embodiment, the geometry of a cluster is a connected elastic surface that encloses all the points. This logic can be used in searching for candidate clusters, for example in step 1008 of FIG. 10. Referring now to FIG. 15, in step 1502, the original set of clusters with their hierarchy of geometric approximations (1501) are input to the process. In step 1502, the candidate set (1505) is initialized to the original set (1501). In step 1506, another initialization step is performed by setting the current approximations to the geometry to zero-th order approximations. In a preferred embodiment, the zero-th order geometric approximations of the clusters are given by the decision regions of the clustering algorithm used to generate the clusters. In step 1507, the distances between the current approximations of the geometry of the cluster and the data point (1503) are computed. All clusters more distant than the candidate set (1505) are discarded and a retained set (1508) of clusters is produced. In step 1509, it is determined if there are better approximations in the hierarchy. If no better approximations exist, the computation is terminated by setting the result set (1512) to be equal to the currently retained set (1508). Otherwise, in step 1510, the candidate set (1505) is set to the currently retained set (1508), the current geometric approximation is set to the immediately better approximation in the hierarchy, and the process return to step 1507.

Now that the invention has been described by way of a preferred embodiment, with alternatives, various modifications and improvements will occur to those of sk-ill in the art. Thus, it should be understood that the detailed description should be construed as an example and not a limitation. The invention is properly defined by the appended claims.

What is claimed is:

1. In a system including one or more reduced dimensionality indexes to multidimensional data, a method for performing an exact search for specified data using the one or more indexes, the method comprising the following steps in the sequence set forth:

associating specified data to a data cluster based on clustering information, said data cluster being a partition of an original data input set;

reducing a dimensionality of the specified data, based on dimensionality reduction information for a reduced dimensionality version of the cluster;

recursively applying said associating and reducing steps unitl a corresponding lowest level of a hierarchy of reduced dimensionality clusters has been reached; and searching, using low dimensional indexes to said lowest level and a reduced dimensionality specified data, for cluster elements of the reduced dimensionality version of the cluster matching the specified data.

2. A method for performing an exact search for specified data, comprising the following steps in the sequence set forth:

associating specified data to a data cluster based on clustering information, said data cluster being a partition from an original data input set;

reducing a dimensionality of the specified data, based on dimensionality reduction information for a reduced dimensionality version of the cluster;

recursively applying said associating and reducing steps until a corresponding lowest level of a hierarchy of reduced dimensionality clusters has been reached; and linearly scanning, based on a reduced dimensionality specified data, for the reduced dimensionality version of the cluster matching the specified data.

3. The method of claim 1, wherein said reducing step comprises a singular value decomposition, said searching further comprising the step of:

searching an index for a matching reduced dimensionality cluster, based on decomposed specified data.

4. The method of claim 3, wherein the specified data includes a search template, further comprising the steps of:

said associating comprising identifying the search template with the cluster, based on the clustering information;

said singular value decomposition comprising projecting the search template onto a subspace for an identified cluster, based on the dimensionality reduction information; and said searching comprising performing an intra-cluster search for a projected template.

5. The method of claim 3, wherein the dimensionality reduction information comprises a transformation matrix and selected eigenvalues of the transformation matrix.

6. The method of claim 1, further comprising the steps of:

reducing the dimensionality of specified data, based on dimensionality reduction information for the database;

wherein said associating step is in response to said reducing the dimensionality of specified data, based on dimensionality reduction information for the database.

7. A program storage device readable by a machine, tangibly embodying a program of instructions executable by the machine to perform method steps for performing an exact search for specified data, said method comprising:

associating specified data to a data cluster based on clustering information, said data cluster being a partition of an original data input set;

after said associating, reducing a dimensionality of the specified data, based on dimensionality reduction information for a reduced dimensionality version of the cluster;

recursively applying said associating and reducing steps until a corresponding lowest level of a hierarchy of reduced dimensionality clusters has been reached; and linearly scanning, based on a reduced dimensionality specified data, for the reduced dimensionality version of the cluster matching the specified data.

8. The method of claim 1, wherein the clustering information comprises an identifier of a centroid of the cluster associated with a unique label.

9. In a system including one or more reduced dimensionality indexes to multidimensional data, a method for searching for k records most similar to specified data, using the one or more indexes, the method comprising the steps of:

identifying the specified data with a cluster based on clustering information, said cluster being a partition from an original data input set;

after said identifying step, reducing a dimensionality of the specified data, based on dimensionality reduction information for an identified cluster;

recursively applying said identifying and reducing steps until a corresponding lowest level of a hierarchy of reduced dimensionality clusters has been reached;

generating dimensionality reduction information for reduced dimensionality specified data, in response to said reducing; and retrieving the $\leq k$ records most similar to the specified data from the identified cluster using the one or more reduced dimensionality indexes, the dimensionality reduction information and the reduced dimensionality specified data.

10. The method of claim 9, further comprising the steps of:

identifying one or more other candidate clusters which can contain records closer to the specified data than the farthest of the k records retrieved;

searching a closest other candidate cluster to the specified data, in response to said identifying step; and repeating said identifying and searching for all said other candidate clusters.

11. The method of claim 9, wherein the specified data includes a search, template, the method further comprising the steps of:

said reducing comprising projecting the specified data onto a subspace for an associated cluster, based on dimensionality reduction information for the identified cluster; and generating dimensionality reduction information including an orthogonal complement for projected specified data, in response to said projecting.

12. The method of claim 11, wherein said retrieving includes a nearest neighbor search, further comprising the steps of:

searching the identified cluster for the k nearest neighbors to the projected specified data;

determining if any other associated clusters can include any of k nearest neighbors to the projected specified data; and repeating said searching on said any clusters that can include any of the k nearest neighbors.

13. The method of claim 12, wherein said retrieving further comprises the step of:
computing the distances (D) between the k nearest neighbors in the identified cluster and the reduced dimensionality specified data as a function of an element index $\delta^2$ where $$\delta^2(\text{template, element}) = D^2(\text{projected\_template, element}) + \Sigma \|\text{orthogonal\_complement}\|^2.$$

14. The method of claim 13, further comprising the step of updating a k nearest neighbor set when an element is found having the index $\delta^2$ value less than a largest index $\delta^2$ currently in the k nearest neighbor set, in response to said determining.

15. The method of claim 11, further comprising the steps of:
wherein said projecting step produces a projected template and template dimensionality reduction information; and wherein said searching, via the index is based on the projected template and the template dimensionality reduction information; and
updating a k-nearest neighbor set of the k records most similar to the search template.

16. The method of claim 9, further comprising the steps of:
reducing the dimensionality of the specified data, based on dimensionality reduction information for a database;
wherein said identifying step is responsive to said reducing the dimensionality of specified data, based on dimensionality reduction information for the database.

17. The method of claim 9, further comprising the steps of:
searching for candidate terminal clusters that can contain one or more of the k records most similar to the specified data at each level of the hierarchy of reduced dimensionality clusters starting from a terminal cluster at a lowest level of said hierarchy to which the specified data belongs; and
for each candidate terminal cluster, performing an intra-cluster search for the k records most similar to the specified data.

18. The method of claim 9, wherein the records retrieved is a function of a precision and a recall.

19. The method of claim 18, further comprising the step of specifying a desired precision of a search and lower bound on an allowed recall; and said reducing comprising the step of deriving a maximum value of precision for which the allowed recall can be attained.

20. The method of claim 18, further comprising the step of specifying a value of desired recall; and said reducing comprising the step of estimating a cost of increasing the precision to attain the desired recall; wherein a number of reduced dimensionality indexes minimizes the cost of a search based on the value of desired recall.

21. A program storage device readable by a machine which includes one or more reduced dimensionality indexes to multidimensional data, the program storage device tangibly embodying a program of instructions executable by the machine to perform method steps for performing an exact search for specified data using the one or more indexes, said method steps comprising:
associating specified data to a data cluster based on clustering information, said data cluster being a partition of an original data input set;
reducing a dimensionality of the specified data, based on dimensionality reduction information for a reduced dimensionality version of the cluster;
recursively applying said associating and reducing steps until a corresponding lowest level of a hierarchy of reduced dimensionality clusters has been reached; and
searching, using low dimensional indexes to said lowest level and a reduced dimensionality specified data, for cluster elements of the reduced dimensionality version of the cluster matching the specified data.

22. The program storage device of claim 21, wherein the clustering information comprises an identifier of a centroid of the cluster associated with a unique label.

23. The program storage device of claim 21, wherein said reducing step comprises a singular value decomposition, said searching further comprising the step of:
searching an index for a matching reduced dimensionality cluster, based on decomposed specified data.

24. The program storage device of claim 23, wherein the specified data includes a search template, further comprising the steps of:
said associating comprising identifying the search template with the cluster, based on the clustering information;
said singular value decomposition comprising projecting the search template onto a subspace for an identified cluster, based on the dimensionality reduction information; and
said searching comprising performing an intra-cluster search for a projected template.

25. The program storage device of claim 23, wherein the dimensionality reduction information comprises a transformation matrix and selected eigenvalues of the transformation matrix.

26. The program storage device of claim 21, further comprising the steps of:
reducing the dimensionality of specified data, based on dimensionality reduction information for the database;
wherein said associating step is in response to said reducing the dimensionality of specified data, based on dimensionality reduction information for the database.

27. A program storage device readable by a machine which includes one or more reduced dimensionality indexes to multidimensional data, the program storage device tangibly embodying a program of instructions executable by the machine to perform method steps for searching for k records most similar to specified data, using the one or more indexes, said method steps comprising:
identifying the specified data with a data cluster based on clustering information, said data cluster being a partition of an original data input set;
after said identifying step, reducing a dimensionality of the specified data, based on dimensionality reduction information for an identified cluster;
recursively applying said identifying and reducing steps until a corresponding lowest level of a hierarchy of reduced dimensionality clusters has been reached;
generating dimensionality reduction information for reduced dimensionality specified data, in response to said reducing; and
retrieving the $\leq k$ records most similar to the specified data, from the identified cluster using the one or more reduced dimensionality indexes, the dimensionality reduction information and the reduced dimensionality specified data.

28. A computer program product comprising:
a computer usable medium having computer readable program code means embodied therein for searching for k records most similar to a search template, using one or more multidimensional indexes, the computer readable program code means in said computer program product comprising:
  computer readable program code cluster search means for identifying the search template with a cluster based on clustering information, said cluster being a partition of an original data input set;
  computer readable program code template projection means for reducing a dimensionality of the search template, after said identifying, based on dimensionality reduction information for an identified cluster;
  computer readable program code means for causing the computer to recursively apply said cluster search means and said template projection means until a corresponding lowest level of a hierarchy of reduced dimensionality clusters has been reached;
  computer readable program code means for generating dimensionality reduction information for a reduced dimensionality search template, in response to said reducing; and
  computer readable program code intra-cluster search means for retrieving the ≦k records most similar to the specified data from the identified cluster using the one or more reduced dimensionality indexes, the dimensionality reduction information and the reduced dimensionality specified data.

29. The computer program product of claim 28, further comprising computer readable program code means for causing the computer to recursively effect: identifying one or more other candidate clusters which can contain records closer to the specified data than the farthest of the k records retrieved; and searching a closest other candidate cluster to the specified data.

30. The program storage device of claim 27, further comprising the steps of:
  identifying one or more other candidate clusters which can contain records closer to the specified data than the farthest of the k records retrieved;
  searching a closest other candidate cluster to the specified data, in response to said determining step; and
  repeating said identifying and searching for all said other candidate clusters.

31. The program storage device of claim 27, wherein the specified data includes a search template, farther comprising the steps of:
  said reducing comprising projecting the specified data onto a subspace for an associated cluster, based on dimensionality reduction information for the identified cluster; and
  generating dimensionality reduction information including an orthogonal complement for projected specified data, in response to said projecting.

32. The program storage device of claim 31, wherein said retrieving includes a nearest neighbor search, further comprising the steps of:
  searching the identified cluster for the k nearest neighbors to the projected specified data;
  determining if any other associated clusters can include any of k nearest neighbors to the projected specified data; and
  repeating said searching on said any clusters that can include any of the k nearest neighbors.

33. The program storage device of claim 32, wherein said retrieving further comprises the step of:
  computing the distances (D) between the k nearest neighbors in the identified cluster and the reduced dimensionality specified data as a function of an element index $\delta^2$ where $$\delta^2(\text{template, element}) = D^2(\text{projected\_template, element}) + \Sigma\|\text{orthogonal\_complement}\|^2.$$

34. The program storage device of claim 33, further comprising the step of updating a k nearest neighbor set when an element is found having the index $\delta^2$ value less than a largest index $\delta^2$ currently in the k nearest neighbor set, in response to said determining.

35. The program storage device of claim 31, further comprising the steps of:
  wherein said projecting step produces a projected template and template dimensionality reduction information; and wherein said retrieving, using the index is based on the projected template and the template dimensionality reduction information; and
  updating a k-nearest neighbor set of the k records most similar to the search template.

36. The program storage device of claim 29, further comprising the steps of:
  reducing the dimensionality of the specified data, based on dimensionality reduction information for a database;
  wherein said identifying step is responsive to said reducing the dimensionality of specified data, based on dimensionality reduction information for the database.

37. The program storage device of claim 29, further comprising the steps of:
  searching for candidate terminal clusters that can contain one or more of the k records most similar to the specified data at each level of the hierarchy of reduced dimensionality clusters starting from a terminal cluster at a lowest level of said hierarchy to which the specified data belongs; and
  for each candidate terminal cluster, performing an intra-cluster search for the k records most similar to the specified data.

38. The program storage device of claim 27, wherein the records retrieved are a function of a precision and a recall.

39. The program storage device of claim 38, further comprising the step of specifying a desired precision of a search and lower bound on an allowed recall; and said reducing comprising the step of deriving a maximum value of precision for which the allowed recall can be attained.

40. The program storage device of claim 38, further comprising the step of specifying a value of desired recall; and said reducing comprising the step of estimating a cost of increasing the precision to attain the desired recall; wherein a number of reduced dimensionality indexes minimizes the cost of a search based on the value of desired recall.

41. A program storage device readable by a machine which includes one or more reduced dimensionality indexes to multidimensional data, the program storage device tangibly embodying a program of instructions executable by the machine to perform method steps for searching for k records most similar to specified data, using the one or more indexes, said method steps comprising:
  identifying the specified data with a cluster based on clustering information, said cluster being a partition of an original data input set;
  after the identifying step, reducing a dimensionality of the specified data, based on dimensionality reduction information for a reduced dimensionality version of an identified cluster;

recursively applying said identifying and reducing steps until a corresponding lowest level of a hierarchy of reduced dimensionality clusters has been reached;

generating dimensionality reduction information for reduced dimensionality specified data, in response to said reducing; and linearly scanning, based on the reduced dimensionality specified data, for the reduced dimensionality version of the cluster matching the specified data.

42. A computer program product comprising:

a computer usable medium having computer readable program code means embodied therein for performing an exact search for a search template using one or more multidimensional indexes, the computer readable program code means in said computer program product comprising:

computer readable program code cluster search means for causing a computer to effect associating specified data to a data cluster based on clustering information, said data cluster being a partition of an original data input set;

computer readable program code template projection means for causing a computer to effect reducing a dimensionality of the search template, after said associating, based on dimensionality reduction information for a reduced dimensionality version of the cluster;

computer readable program code means for causing a computer to effect recursively applying said cluster search means and template projection means until a corresponding lowest level of a hierarchy of reduced dimensionality clusters has been reached; and computer readable program code intra-cluster search means for causing a computer to effect searching, using low dimensional indexes to said lowest level and a reduced dimensionality search template, for cluster elements of the reduced dimensionality version of the cluster matching the search template.

43. The computer program product of claim 42, wherein said template projection means comprises a singular value decomposition means for causing a computer to effect projecting the search template onto a subspace for an identified cluster, based on the dimensionality reduction information.

44. The computer program product of claim 42, further comprising computer readable program code means for causing a computer to effect reducing the dimensionality of the search template, based on dimensionality reduction information for the database;

wherein said cluster search means is coupled to said means for causing a computer to effect reducing the dimensionality of the search template, based on dimensionality reduction information for the database.

45. The computer program product of claim 28, wherein said cluster search means for causing a computer to effect associating specified data to a reduced dimensionality cluster further comprises:

computer readable program code cluster search means for causing a computer to effect adapting to the local structure of data.

46. The computer program product of claim 29, wherein said computer readable program code means for causing the computer to recursively effect: identifying one or more other candidate clusters which can contain records closer to the specified data than the farthest of the k records retrieved, further comprises:

computer readable program code means for causing the computer to identify said other candidate clusters that can contain elements closer than a prescribed distance from a data point, using a hierarchy of successive approximations to the geometry of the clusters.

47. The computer program product of claim 46, wherein said computer readable program code means for causing the computer to identify said other candidate clusters that can contain elements closer than a prescribed distance from a data point, using a hierarchy of successive approximations to the geometry of the clusters, further comprises:

(a) computer readable program code means for causing the computer to retain the cluster only if it can contain any of k-nearest neighbors of specified data, based on a cluster boundaries;

(b) computer readable program code means for causing the computer to iteratively determine if a retained cluster could contain any of the k-nearest neighbors, based on increasingly finer approximations to the geometry, and retaining the retained cluster only if the cluster is accepted at the finest level of the hierarchy of successive approximations; and (c) computer readable program code means for causing the computer to identify a retained cluster as a candidate cluster containing one or more of the k-nearest neighbors of the data.

48. The computer program product of claim 46, wherein said intra-cluster search logic further comprises computer readable program code nearest neighbor search means for causing the computer to compute the distances (D) between k nearest neighbors in the identified cluster and the reduced dimensionality search template as a function of an element index $\delta^3$ where $$\delta^2(\text{template, element}) = D^2(\text{projected\_template, element}) + \Sigma \|\text{orthogonal\_complement}\|^2.$$

49. The computer program product of claim 46, wherein said template projection means comprises computer readable program code means to cause the computer to produce a projected template and template dimensionality reduction information; and wherein said intra-cluster logic means is based on the projected template and the template dimensionality reduction information; and computer readable program code means for causing the computer to update a k-nearest neighbor set of the k records most similar to the search template.

50. The computer program product of claim 46, further comprising computer readable program code means for causing the computer to effect reducing the dimensionality of the search template, based on dimensionality reduction information for a database;

wherein said cluster search means is coupled to said means for causing the computer to effect reducing the dimensionality of the search template, based en dimensionality reduction information for the database.

51. The computer program product of claim 28, further comprising:

computer readable program code means for causing the computer to search for candidate terminal clusters that can contain one or more of the k records most similar to the search template at each level of the hierarchy of reduced dimensionality clusters starting from a terminal cluster at a lowest level of said hierarchy to which the search template belongs; and computer readable program code means for causing the computer to effect for each candidate terminal cluster, performing an intra-cluster search for the k records most similar to the search template.

* * * * *